US012645164B2

United States Patent

(12) Toyoda et al.

(10) Patent No.: US 12,645,164 B2
(45) Date of Patent: Jun. 2, 2026

(54) TONER

(71) Applicant: CANON KABUSHIKI KAISHA, Tokyo (JP)

(72) Inventors: Takayuki Toyoda, Shizuoka (JP); Tomohisa Sano, Shizuoka (JP); Shohei Shibahara, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 513 days.

(21) Appl. No.: 18/173,255

(22) Filed: Feb. 23, 2023

(65) Prior Publication Data

US 2023/0273540 A1 Aug. 31, 2023

(30) Foreign Application Priority Data

Feb. 28, 2022 (JP) ................................ 2022-028815
Nov. 24, 2022 (JP) ................................ 2022-187676

(51) Int. Cl.
*G03G 9/097* (2006.01)
*G03G 9/08* (2006.01)

(52) U.S. Cl.
CPC ....... *G03G 9/09708* (2013.01); *G03G 9/0819* (2013.01); *G03G 9/0827* (2013.01); *G03G 9/09725* (2013.01)

(58) Field of Classification Search
CPC ....................... G03G 9/09725; G03G 9/09708
See application file for complete search history.

(56) References Cited

U.S. PATENT DOCUMENTS

| | | | |
|---|---|---|---|
| 7,123,862 B2 | 10/2006 | Hasegawa | |
| 7,141,342 B2 | 11/2006 | Toyoda | |
| 7,264,910 B2 | 9/2007 | Toyoda | |
| 7,537,875 B2 | 5/2009 | Mikuriya et al. | |

(Continued)

FOREIGN PATENT DOCUMENTS

| | | |
|---|---|---|
| CN | 100507727 C | 7/2009 |
| EP | 3 709 087 A1 | 9/2020 |

(Continued)

OTHER PUBLICATIONS

Nakazato, Machine Translation of JP 2014-209197A, Nov. 6, 2014 (Year: 2014).*

(Continued)

*Primary Examiner* — Peter L Vajda
*Assistant Examiner* — Jenna Kuipers
(74) *Attorney, Agent, or Firm* — VENABLE LLP

(57) ABSTRACT

A toner comprising a toner particle and an external additive, wherein the external additive comprises a silica particle and a hydrotalcite particle containing fluorine which is present in cross sections of the hydrotalcite particle, wherein, when a content of the hydrotalcite particle containing the fluorine and a content of the silica particle to 100 parts by mass of the toner particle are defined as Wh and Ws respectively, Wh and Ws are in specific ranges, and a sum of areas of peaks which are present in a range of −140 to 100 ppm of a chemical shift of the silica particle obtained by a solid-state $^{29}$Si-NMR DD/MAS method is defined as S, the area of the peak of a D unit and Q unit are defined as D and Q respectively, the Wh, the Ws, S, the D, and the Q satisfy a specific relationship.

6 Claims, 1 Drawing Sheet

(56) References Cited

U.S. PATENT DOCUMENTS

| | | | |
|---|---|---|---|
| 7,582,401 | B2 | 9/2009 | Ogawa |
| 7,611,812 | B2 | 11/2009 | Michel et al. |
| 7,678,523 | B2 | 3/2010 | Hiroko |
| 7,678,524 | B2 | 3/2010 | Hasegawa |
| 7,833,685 | B2 | 11/2010 | Tanaka |
| 7,833,687 | B2 | 11/2010 | Kato |
| 7,923,190 | B2 | 4/2011 | Magome |
| 7,935,467 | B2 | 5/2011 | Dojo |
| 8,211,606 | B2 | 7/2012 | Murai |
| 8,227,162 | B2 | 7/2012 | Sano |
| 8,377,616 | B2 | 2/2013 | Tani |
| 8,426,091 | B2 | 4/2013 | Magome |
| 8,426,094 | B2 | 4/2013 | Magome |
| 8,518,620 | B2 | 8/2013 | Dojo |
| 8,614,044 | B2 | 12/2013 | Matsui |
| 8,628,899 | B2 | 1/2014 | Kawamura |
| 8,652,722 | B2 | 2/2014 | Yoshida et al. |
| 8,697,327 | B2 | 4/2014 | Shibata |
| 8,778,585 | B2 | 7/2014 | Matsui |
| 8,815,484 | B2 | 8/2014 | Tanaka |
| 8,828,639 | B2 | 9/2014 | Kamikura |
| 8,841,054 | B2 | 9/2014 | Dojo |
| 8,916,319 | B2 | 12/2014 | Ikeda |
| 8,940,467 | B2 | 1/2015 | Hashimoto |
| 9,034,549 | B2 | 5/2015 | Shiotari |
| 9,040,216 | B2 | 5/2015 | Fukudome |
| 9,116,448 | B2 | 8/2015 | Terauchi |
| 9,134,637 | B2 | 9/2015 | Hotta |
| 9,141,012 | B2 | 9/2015 | Moribe |
| 9,146,485 | B2 | 9/2015 | Tani |
| 9,152,065 | B2 | 10/2015 | Sano |
| 9,158,216 | B2 | 10/2015 | Shimano |
| 9,229,345 | B2 | 1/2016 | Ikeda |
| 9,235,151 | B2 | 1/2016 | Tanaka |
| 9,256,148 | B2 | 2/2016 | Fujikawa |
| 9,261,806 | B2 | 2/2016 | Moribe |
| 9,285,697 | B2 | 3/2016 | Fukudome |
| 9,377,705 | B2 | 6/2016 | Shimano |
| 9,377,708 | B2 | 6/2016 | Magome |
| 9,383,668 | B2 | 7/2016 | Noji |
| 9,423,714 | B2 | 8/2016 | Kenmoku |
| 9,470,993 | B2 | 10/2016 | Nishikawa |
| 9,500,972 | B2 | 11/2016 | Tanaka |
| 9,551,947 | B2 | 1/2017 | Hiroko |
| 9,556,290 | B2 | 1/2017 | Nishiura |
| 9,575,424 | B2 | 2/2017 | Nakagawa |
| 9,575,425 | B2 | 2/2017 | Naka |
| 9,588,450 | B2 | 3/2017 | Tsuda |
| 9,594,323 | B2 | 3/2017 | Fujikawa |
| 9,599,919 | B2 | 3/2017 | Isono |
| 9,606,462 | B2 | 3/2017 | Nomura |
| 9,632,441 | B2 | 4/2017 | Abe |
| 9,658,546 | B2 | 5/2017 | Tanaka |
| 9,658,549 | B2 | 5/2017 | Tanaka |
| 9,715,187 | B2 | 7/2017 | Mukumoto |
| 9,715,188 | B2 | 7/2017 | Terauchi |
| 9,720,340 | B2 | 8/2017 | Tominaga |
| 9,772,570 | B2 | 9/2017 | Tsuda |
| 9,778,583 | B2 | 10/2017 | Terauchi |
| 9,785,068 | B2 | 10/2017 | Umeda |
| 9,785,071 | B2 | 10/2017 | Shimano |
| 9,804,514 | B2 | 10/2017 | Suzumura |
| 9,804,519 | B2 | 10/2017 | Suzumura |
| 9,829,814 | B2 | 11/2017 | Yoshida |
| 9,829,816 | B2 | 11/2017 | Tanaka |
| 9,835,964 | B2 | 12/2017 | Yoshida |
| 9,841,692 | B2 | 12/2017 | Hasegawa |
| 9,857,707 | B2 | 1/2018 | Tsuda |
| 9,857,711 | B2 | 1/2018 | Yoshida |
| 9,880,478 | B2 | 1/2018 | Shimano |
| 9,904,193 | B2 | 2/2018 | Nakagawa |
| 9,904,195 | B2 | 2/2018 | Matsui |
| 9,927,728 | B2 | 3/2018 | Arimura |
| 9,946,179 | B2 | 4/2018 | Arimura |
| 9,946,181 | B2 | 4/2018 | Hasegawa |
| 9,952,523 | B2 | 4/2018 | Shimano |
| 9,958,801 | B2 | 5/2018 | Tanaka |
| 9,964,874 | B2 | 5/2018 | Suzumura |
| 9,964,881 | B2 | 5/2018 | Ikejiri |
| 9,971,262 | B2 | 5/2018 | Hasegawa |
| 9,971,263 | B2 | 5/2018 | Fukudome |
| 9,971,264 | B2 | 5/2018 | Sano |
| 10,012,919 | B2 | 7/2018 | Matsui |
| 10,012,923 | B2 | 7/2018 | Sano |
| 10,054,866 | B2 | 8/2018 | Tanaka |
| 10,101,683 | B2 | 10/2018 | Nishikawa |
| 10,114,303 | B2 | 10/2018 | Katsura |
| 10,156,800 | B2 | 12/2018 | Tsuda |
| 10,197,934 | B2 | 2/2019 | Matsui |
| 10,228,627 | B2 | 3/2019 | Nagashima |
| 10,289,016 | B2 | 5/2019 | Fukudome |
| 10,295,921 | B2 | 5/2019 | Ohmori |
| 10,303,074 | B2 | 5/2019 | Yamawaki |
| 10,310,396 | B2 | 6/2019 | Kamikura |
| 10,310,397 | B2 | 6/2019 | Sano |
| 10,338,487 | B2 | 7/2019 | Kamikura |
| 10,345,726 | B2 | 7/2019 | Nakamura |
| 10,353,308 | B2 | 7/2019 | Hatakeyama |
| 10,401,750 | B2 | 9/2019 | Nakamura |
| 10,429,757 | B2 | 10/2019 | Yoshida |
| 10,503,090 | B2 | 12/2019 | Tominaga |
| 10,539,893 | B2 | 1/2020 | Tanaka |
| 10,545,420 | B2 | 1/2020 | Kinumatsu |
| 10,545,422 | B2 | 1/2020 | Yamawaki |
| 10,551,758 | B2 | 2/2020 | Tanaka |
| 10,578,990 | B2 | 3/2020 | Tsuda |
| 10,635,010 | B2 | 4/2020 | Kamikura |
| 10,635,011 | B2 | 4/2020 | Umeda |
| 10,698,327 | B2 | 6/2020 | Nagashima |
| 10,732,530 | B2 | 8/2020 | Matsui |
| 10,782,623 | B2 | 9/2020 | Yoshiba |
| 10,845,721 | B2 | 11/2020 | Tanaka |
| 10,845,722 | B2 | 11/2020 | Nishikawa |
| 10,859,933 | B2 | 12/2020 | Kinumatsu |
| 10,877,387 | B2 | 12/2020 | Fukudome |
| 10,877,388 | B2 | 12/2020 | Aoki |
| 10,877,389 | B2 | 12/2020 | Kamikura |
| 10,895,815 | B2 | 1/2021 | Kamikura |
| 10,942,466 | B2 | 3/2021 | Tominaga |
| 10,976,678 | B2 | 4/2021 | Yamawaki |
| 10,976,679 | B2 | 4/2021 | Tanaka |
| 11,003,103 | B2 | 5/2021 | Kinumatsu |
| 11,003,104 | B2 | 5/2021 | Katsura |
| 11,003,105 | B2 | 5/2021 | Sato |
| 11,092,905 | B2 | 8/2021 | Fukudome |
| 11,099,493 | B2 | 8/2021 | Komiya |
| 11,112,708 | B2 | 9/2021 | Uratani |
| 11,112,710 | B2 | 9/2021 | Nakayama |
| 11,112,712 | B2 | 9/2021 | Matsunaga |
| 11,112,714 | B2 | 9/2021 | Amano |
| 11,169,458 | B2 | 11/2021 | Toyoizumi |
| 11,169,460 | B2 | 11/2021 | Kototani |
| 11,175,600 | B2 | 11/2021 | Uchiyama |
| 11,181,839 | B2 | 11/2021 | Yamashita |
| 11,181,840 | B2 | 11/2021 | Nagata |
| 11,181,844 | B2 | 11/2021 | Nagaoka |
| 11,181,845 | B2 | 11/2021 | Shimoda |
| 11,181,846 | B2 | 11/2021 | Kinumatsu |
| 11,249,408 | B2 | 2/2022 | Tsuda |
| 11,249,412 | B2 | 2/2022 | Kawamura |
| 11,256,187 | B2 | 2/2022 | Ogaki |
| 11,287,758 | B2 | 3/2022 | Matsui |
| 11,314,178 | B2 | 4/2022 | Kenmoku |
| 11,333,989 | B2 | 5/2022 | Unno |
| 11,347,157 | B2 | 5/2022 | Kamikura |
| 11,448,980 | B2 | 9/2022 | Matsui |
| 11,531,282 | B2 | 12/2022 | Kamikura |
| 11,573,519 | B2 | 2/2023 | Fumita |
| 2009/0305159 | A1 | 12/2009 | Zhou et al. |
| 2015/0004540 | A1 | 1/2015 | Ozawa |
| 2015/0010652 | A1 | 1/2015 | Kurogi |
| 2018/0120721 | A1 * | 5/2018 | Obara ................ G03G 9/08797 |
| 2019/0064686 | A1 | 2/2019 | Terauchi |
| 2020/0285165 | A1 | 9/2020 | Chiba et al. |

(56) References Cited

U.S. PATENT DOCUMENTS

| | | | |
|---|---|---|---|
| 2020/0292956 | A1 | 9/2020 | Amano |
| 2021/0003934 | A1 | 1/2021 | Fumita |
| 2021/0132519 | A1 | 5/2021 | Hashimoto |
| 2021/0223731 | A1 | 7/2021 | Suzuki |
| 2021/0373450 | A1 | 12/2021 | Kawaguchi |
| 2021/0397110 | A1 | 12/2021 | Katsura |
| 2021/0405549 | A1 | 12/2021 | Ookubo |
| 2022/0026822 | A1 | 1/2022 | Sato |
| 2022/0026823 | A1 | 1/2022 | Sano |
| 2022/0121132 | A1 | 4/2022 | Yoshida |
| 2022/0121133 | A1 | 4/2022 | Yamawaki |
| 2022/0128915 | A1 | 4/2022 | Toyoda |
| 2022/0128916 | A1 | 4/2022 | Yoshida |
| 2022/0128919 | A1 | 4/2022 | Kawamura |
| 2022/0146952 | A1 | 5/2022 | Komiya |
| 2022/0146955 | A1 | 5/2022 | Nozaki |
| 2022/0171301 | A1 | 6/2022 | Suzumura |
| 2022/0171302 | A1 | 6/2022 | Sato |
| 2022/0171303 | A1 | 6/2022 | Hiramatsu |
| 2022/0206402 | A1 | 6/2022 | Uratani |
| 2022/0214629 | A1 | 7/2022 | Kenmoku |
| 2022/0214630 | A1 | 7/2022 | Kamikura |
| 2022/0291601 | A1 | 9/2022 | Katsura |
| 2022/0326633 | A1 | 10/2022 | Aoki |
| 2022/0365457 | A1 | 11/2022 | Unno |
| 2022/0373916 | A1 | 11/2022 | Adachi |
| 2022/0390870 | A1 | 12/2022 | Kyuushima |
| 2022/0390871 | A1 | 12/2022 | Isono |
| 2022/0397836 | A1 | 12/2022 | Toyoda |
| 2022/0404730 | A1 | 12/2022 | Nagaoka |
| 2023/0014130 | A1 | 1/2023 | Sano |
| 2023/0015518 | A1 | 1/2023 | Nozaki |
| 2023/0042289 | A1 | 2/2023 | Tanaka |
| 2023/0047510 | A1 | 2/2023 | Tsuda |
| 2023/0047560 | A1 | 2/2023 | Saeki |
| 2023/0080900 | A1 | 3/2023 | Kamikura |
| 2023/0117448 | A1 | 4/2023 | Fukudome |
| 2023/0122974 | A1 | 4/2023 | Kagawa |

FOREIGN PATENT DOCUMENTS

| | | | | | |
|---|---|---|---|---|---|
| JP | 55-28750 | A | | 2/1980 | |
| JP | 2000-35692 | A | | 2/2000 | |
| JP | 2002-221820 | A | | 8/2002 | |
| JP | 2005-272323 | A | | 10/2005 | |
| JP | 2006-500605 | A | | 1/2006 | |
| JP | 2007-322953 | A | | 12/2007 | |
| JP | 2009-42343 | A | | 2/2009 | |
| JP | 2013-68901 | A | | 4/2013 | |
| JP | 2014209197 | A | * | 11/2014 | ............... G03G 9/08 |
| JP | 2015-11077 | A | | 1/2015 | |
| JP | 2017-10002 | A | | 1/2017 | |
| JP | 2017-198929 | A | | 11/2017 | |
| JP | 2019-45578 | A | | 3/2019 | |
| JP | 2019-168632 | A | | 10/2019 | |
| JP | 2020-109511 | A | | 7/2020 | |
| JP | 2020-148928 | A | | 9/2020 | |
| JP | 2021-9251 | A | | 1/2021 | |
| WO | 2013/147284 | A1 | | 10/2013 | |
| WO | 2018/181189 | A1 | | 10/2018 | |

OTHER PUBLICATIONS

Kyowa Chemical Industry DHT-4A technical data sheet (2025).
U.S. Appl. No. 18/046,585, Yuta Komiya, filed Oct. 14, 2022.
U.S. Appl. No. 18/173,247, Kosuke Fukudome, filed Feb. 23, 2023.
U.S. Appl. No. 18/173,278, Shohei Tsuda, filed Feb. 23, 2023.
U.S. Appl. No. 18/173,501, Taiji Katsura, filed Feb. 23, 2023.
U.S. Appl. No. 18/173,512, Masatake Tanaka, filed Feb. 23, 2023.
U.S. Appl. No. 18/307,825, Hiroki Kagawa, filed Apr. 27, 2023.
U.S. Appl. No. 18/307,829, Kazuyuki Sato, filed Apr. 27, 2023.
U.S. Appl. No. 18/307,832, Shohei Shibahara, filed Apr. 27, 2023.

* cited by examiner

TONER

BACKGROUND OF THE INVENTION

Field of the Invention

The present disclosure relates to a toner used in recording methods using electrophotography or the like.

Description of the Related Art

In recent years, copiers and printers have been required to have smaller sizes, higher speeds, and longer service lives, as well as to be able to obtain stable images without deterioration in image quality in any environment.

For example, Japanese Patent Application Laid-Open No. 2000-035692 proposes a toner using, as an external additive, hydrotalcite particles as represented by formula (A) in order to impart a high electrification property even in a high temperature and high humidity environment.

$$M^{2+}{}_yM^{3+}{}_x(OH)_2A^{n-}{}_{(x/n)}\cdot{}_mH_2O \quad \text{Formula (A)}$$

($M^{2+}$ represents a divalent metal ion selected from at least Mg, Zn, Ca, Ba, Ni, Sr, Cu, and Fe; $M^{3+}$ represents a trivalent metal ion selected from at least Al, B, Ga, Fe, Co, and In; $A^{n-}$ represents an n-valent anion selected from at least $CO_3^{2-}$, $OH^-$, $Cl^-$, $I^-$, $F^-$, $Br^-$, $SO_4^{2-}$, $HCO_3^-$, $CH_3COO^-$, and $NO_3^-$, here, $0<x\leq0.5$, $x+y=1$, and $m\geq0$.)

SUMMARY OF THE INVENTION

When the hydrotalcite particles are present on the surface of a toner particle, the hydrotalcite particles have a polarity opposite to that of the toner particle, and when the electrification is attenuated, the hydrotalcite particles can increase the electrification like a microcarrier. Furthermore, from past studies, it is understood that, when hydrotalcite particles containing fluorine are used, excessive electrification of the toner can be curbed, and even in long-term continuous use, charge-up can be curbed to make the electrification uniform.

However, when hydrotalcite particles containing fluorine and silica particles are used together, the silica particles may adhere to the surface of the hydrotalcite particles containing fluorine to form aggregates. This hinders the microcarrier effect of the hydrotalcite particles containing fluorine.

The present disclosure provides a toner that achieves all of the high electrification property, developability, and fluidity at high levels through long-term durable use regardless of the usage environment.

The present disclosure relates to a toner comprising a toner particle and an external additive, wherein the external additive comprises a silica particle and a hydrotalcite particle, fluorine is present inside the hydrotalcite particle in line analysis of STEM-EDS mapping analysis of the toner;

when a content of the hydrotalcite particle with respect to 100 parts by mass of the toner particle is defined as Wh, the Wh is 0.040 to 1.000 parts by mass, when a content of the silica particle with respect to 100 parts by mass of the toner particle is defined as Ws, the Ws is 0.08 to 6.00 parts by mass, and, when a sum of areas of peaks of an M unit, a D unit, a T unit, and a Q unit which are present in a range of −140 to 100 ppm of a chemical shift of the silica particle obtained by a solid-state $^{29}$Si-NMR DD/MAS method is defined as S, an area of a peak of the D unit of which a peak top is present in a range of −25 to −15 ppm is defined as D, and an area of a peak of the Q unit of which a peak top is present in a range of −130 to −85 ppm is defined as Q, the Wh, the Ws, the S, the D, and the Q satisfy following formulas (1) to (3):

$$0.05\leq D/Q\leq0.50 \quad (1)$$

$$0.95\leq D/(S-Q)\leq1.00 \quad (2)$$

$$0.4\leq Ws/Wh\leq20.0 \quad (3).$$

According to the present disclosure, it is possible to provide a toner that achieves all of the high electrification property, developability, and fluidity at high levels through long-term durable use regardless of the usage environment.

Further features of the present invention will become apparent from the following description of exemplary embodiments with reference to the attached drawings.

DESCRIPTION OF THE EMBODIMENTS

Figure 1A:
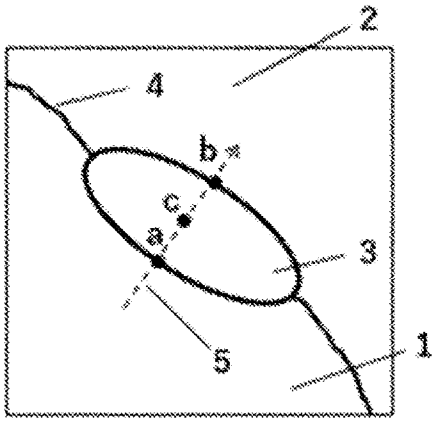
FIGS. 1A to 1C are schematic diagrams of EDS line analysis of STEM-EDS mapping analysis.

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined.

First, in the hydrotalcite particle containing fluorine, the fluorine is intercalated between hydrotalcite layers, and thus the charges of the hydrotalcite particle with positive charges are made uniform and excessive charges are curbed.

However, the intercalation of highly electronegative fluorine between the layers increases the charge density on the surface of the hydrotalcite particle. Therefore, when a highly polarized substance approaches the surface of the hydrotalcite particle, a strong induced dipole interaction acts and the adhesion becomes strong. Depending on the treatment state of silica added as an external additive, silica particle adheres to the surface of the hydrotalcite particle containing fluorine to form aggregates, and thus a microcarrier effect of the hydrotalcite particle is hindered.

As a result of intensive studies, the present inventors found that it is effective to appropriately control the relationship between the content of the hydrotalcite particle containing fluorine and the content of the silica particle, and the treatment state of the silica.

The present disclosure relates to a toner comprising a toner particle and an external additive, wherein the external additive comprises a silica particle and a hydrotalcite particle, fluorine is present inside the hydrotalcite particle in line analysis of STEM-EDS mapping analysis of the toner;

when a content of the hydrotalcite particle with respect to 100 parts by mass of the toner particle is defined as Wh, the Wh is 0.040 to 1.000 parts by mass, when a content of the silica particle with respect to 100 parts by mass of the toner particle is defined as Ws, the Ws is 0.08 to 6.00 parts by mass, and, when a sum of areas of peaks of an M unit, a D unit, a T unit, and a Q unit which are present in a range of −140 to 100 ppm of a chemical shift of the silica particle obtained by a solid-state $^{29}$Si-NMR DD/MAS method is defined as S, an area of a peak of the D unit of which a peak top is present in a range of −25 to −15 ppm is defined as D, and an area of a peak of the Q unit of which a peak top is present in a range of −130 to −85 ppm is defined as Q, the Wh, the Ws, the S, the D, and the Q satisfy following formulas (1) to (3):

$$0.05 \leq D/Q \leq 0.50 \quad (1)$$

$$0.95 \leq D/(S-Q) \leq 1.00 \quad (2)$$

$$0.4 \leq Ws/Wh \leq 20.0 \quad (3).$$

The presence or absence of fluorine content in the hydrotalcite particle can be verified through the STEM-EDS analysis of the toner. The fluorine is necessarily present inside the hydrotalcite particle in line analysis of the STEM-EDS mapping analysis of the toner. The fluorine and the aluminum are preferably present. The detection of the fluorine inside the hydrotalcite particle through the above analysis indicates that the fluorine is intercalated between layers of the hydrotalcite particles. When the fluorine is present inside the hydrotalcite particle, the fluidity of the toner can be improved, and the regulation failure can be curbed to improve the solid followability.

When a content of the hydrotalcite particle with respect to 100 parts by mass of the toner particle is defined as Wh, Wh is 0.040 to 1.000 parts by mass. Wh is preferably 0.050 to 0.800 parts by mass, more preferably 0.100 to 0.500 parts by mass, and further preferably 0.100 to 0.400 parts by mass.

If Wh is less than 0.040 parts by mass, the microcarrier effect will not be sufficiently exhibited, and the electrification rising property will easily deteriorate. On the other hand, when Wh is more than 1.000 parts by mass, the fluidity of the toner remarkably deteriorates, resulting in poor solid followability.

The surface treatment state of the silica particle is calculated by a solid-state $^{29}$Si-NMR DD/MAS method. In the DD/MAS measurement method, since all Si atoms in a measurement sample are observed, quantitative information on the chemical bonding state of the Si atoms in the silica particle can be obtained.

Generally, in solid-state $^{29}$Si-NMR, four peaks of an M unit (formula (4)), a D unit (formula (5)), a T unit (formula (6)), and a Q unit (formula (7)) can be observed with respect to Si atoms in a solid sample.

M unit: $(R_i)(R_j)(R_k)SiO_{1/2}$ Formula (4)

D unit: $(R_g)(R_h)Si(O_{1/2})_2$ Formula (5)

T unit: $R_mSi(O_{1/2})_3$ Formula (6)

Q unit: $Si(O_{1/2})_4$ Formula (7)

$R_i$, $R_j$, $R_k$, $R_g$, $R_h$, and $R_m$ in formulas (4), (5), and (6) indicate an alkyl group such as a hydrocarbon group having 1 to 6 carbon atoms, a halogen atom, a hydroxy group, an acetoxy group, an alkoxy group, and the like, which are bonded to silicon.

When the silica particles are subjected to DD/MAS measurement, the Q unit indicates a peak corresponding to Si atoms in the silica particles prior to surface treatment. In the present disclosure, in a case where silica particles are surface-treated with a surface treatment agent such as silicone oil, the silica particles include a portion derived from the surface treatment agent. Further, the silica particles that have not yet been surface-treated are also referred to as a silica substrate. Each of the M unit, the D unit, and the T unit indicates a peak corresponding to the structure of the silica surface treatment agent represented by formulas (4) to (6) above.

All of these can be identified with the chemical shift value of a solid-state $^{29}$Si-NMR spectrum, the Q unit appears in the chemical shift of −130 to −85 ppm, the T unit appears in the chemical shift of −51 to −65 ppm, the D unit appears in the chemical shift of −25 to −15 ppm, and the M unit appears in the chemical shift of 10 to 25 ppm, and they can be quantified by integrated values.

The sum of areas of the peaks of the M unit, the D unit, the T unit, and the Q unit which are present in a range of −140 to 100 ppm of the chemical shift of the silica particles obtained by a solid-state $^{29}$Si-NMR DD/MAS method is defined as S. Further, the area of the peak of the D unit of which a peak top is present in a range of −25 to −15 ppm is defined as D, and the area of the peak of the Q unit of which a peak top is present in a range of −130 to −85 ppm is defined as Q. At this time, S, D, and Q satisfy the following formulas (1) and (2).

$$0.05 \leq D/Q \leq 0.50 \quad (1)$$

$$0.95 \leq D/(S-Q) \leq 1.00 \quad (2)$$

The parameter D/Q refers to the Si atomic weight constituting the D unit with respect to the Si atomic weight derived from the silica substrate. Since (S−Q) corresponds to the Si atomic weight of the entire silica minus the Si atomic weight derived from the silica substrate, D/(S−Q) means the Si atomic weight constituting the D unit with respect to the Si atomic weight derived from the surface treatment agent.

When D/Q is less than 0.05, the amount of the surface treatment agent with respect to the silica substrate is too small, and thus sufficient hydrophobicity cannot be obtained. When D/Q is more than 0.50, the amount of the surface treatment agent is too large, and thus the fluidity between the silicas deteriorates.

When D/Q is from 0.05 to 0.50, both hydrophobicity and fluidity of the silica particles can be achieved. D/Q is preferably from 0.10 to 0.40 and more preferably from 0.20 to 0.35. D/Q can be controlled by adjusting the amount of raw materials during production of the surface-treated silica.

When D/(S−Q) is less than 0.95, the polarization of the surface treatment agent becomes strong, and the silica particles and the hydrotalcite particles containing fluorine strongly adhere to each other to form aggregates, and thus the microcarrier effect is hindered. As a result, the electrification rising property after long-term durable use deteriorates, and blade fusion and regulation failure are likely to occur. D/(S−Q) is preferably from 0.98 to 1.00 and more preferably from 0.99 to 1.00.

As D/(S−Q) increases, the number of Si atoms in the surface treatment agent constituting the D unit increases. Since Si with a D unit structure has higher molecular symmetry than the Si atoms with an M unit structure or a T unit structure, the polarization of a Si—O bonding portion is relaxed, and the adhesion of the silica particles to the hydrotalcite particles containing fluorine is curbed. D/(S−Q) can be controlled by adjusting the amount of raw materials during production of the surface-treated silica.

In addition, when the area of the peak of the M unit of which a peak top is present in a range of 0 ppm to 30 ppm of the chemical shift of the silica particle obtained by the solid-state $^{29}Si$-NMR DD/MAS method is defined as M, M/S is preferably 0.010 or less, more preferably 0.006 or less, and further preferably 0.002 or less. Although the lower limit is not particularly limited, it is preferably 0.000 or more. M/S is particularly preferably 0.000. M/S represents a ratio of the M unit structure to the amount of Si in the silica particles as a whole. When M/S is within the above range, the polarization of silicon and oxygen on the surface of the silica particles is relaxed, and the adhesion of the silica particles to the hydrotalcite particles containing fluorine is curbed.

When a content of the silica particles with respect to 100 parts by mass of the toner particle is defined as Ws, Ws is 0.08 to 6.00 parts by mass. Wh is preferably 0.10 to 5.50 parts by mass, more preferably 0.20 to 5.00 parts by mass, further preferably 0.50 to 1.70 parts by mass, and even further preferably 1.00 to 1.50 parts by mass. When Ws is within the above range, a toner excellent in fluidity and durability can be obtained.

Further, a ratio (Ws/Wh) of the content Ws of the silica particles to the content Wh of the hydrotalcite particles containing fluorine has to satisfy the following formula (3).

$$0.4 \leq Ws/Wh \leq 20.0 \quad (3)$$

Ws/Wh is preferably from 1.0 to 10.0 and more preferably from 4.0 to 8.0. When Ws/Wh is less than 0.4, the amount of the silica particles with respect to the hydrotalcite particles containing fluorine is small, and the fluidity of the toner deteriorates. When Ws/Wh is more than 20.0, the silica particles are too much compared to the hydrotalcite particles containing fluorine. Therefore, the silica particles prevent contact between the hydrotalcite particles containing fluorine and the toner particle, and thus the hydrotalcite particles containing fluorine are easily detached from the toner, resulting in contamination of members.

As described above, when the hydrotalcite particles containing fluorine and the specific silica particles are combined with each other, it is possible to curb the adhesion between the silica particles and the hydrotalcite particles containing fluorine. Therefore, the hydrotalcite particles containing fluorine can exhibit their original performance as the microcarrier even in the early to late periods during long-term durable use. As a result, it is conceivable that it is possible to achieve all of the high electrification property, developability, and fluidity at high levels regardless of the usage environment.

Each component constituting the toner and a method for manufacturing the toner will be described in more detail.

Binder Resin

Preferably, the toner particle comprises a binder resin. As the binder resin, the following polymers or resins can be used. Preferably, the binder resin comprises a polyester resin, and more preferably, the binder resin comprises amorphous polyester.

For example, a homopolymer of styrene such as polystyrene, poly-p-chlorostyrene, or polyvinyltoluene and a substituted product thereof; styrene-based copolymers such as a styrene-p-chlorostyrene copolymer, a styrene-vinyltoluene copolymer, a styrene-vinylnaphthalene copolymer, a styrene-acrylate ester copolymer, a styrene-methacrylate ester copolymer, a styrene-$\alpha$-methyl chloromethacrylate copolymer, a styrene-acrylonitrile copolymer, a styrene-vinyl methyl ether copolymer, a styrene-vinyl ethyl ether copolymer, a styrene-vinyl methyl ketone copolymer, and a styrene-acrylonitrile-indene copolymer; and polyvinyl chloride, a phenolic resin, a natural resin-modified phenolic resin, a natural resin-modified maleic acid resin, an acrylic resin, a methacrylic resin, polyvinyl acetate, a silicone resin, a polyester resin, a polyurethane resin, a polyamide resin, a furan resin, an epoxy resin, a xylene resin, polyvinyl butyral, a terpene resin, a cumarone-indene resin, petroleum-based resins, and the like can be used.

The amorphous polyester is a resin having a "polyester structure" in a binder resin chain. Specific examples of components constituting the polyester structure include an alcohol monomer component having a valence of 2 or more and acid monomer components such as a carboxylic acid having a valence of 2 or more, a carboxylic acid anhydride having a valence of 2 or more, and a carboxylic acid ester having a valence of 2 or more.

Examples of the alcohol monomer component having a valence of 2 or more include alkylene oxide adducts of bisphenol A such as polyoxypropylene (2.2)-2,2-bis(4-hydroxyphenyl)propane, polyoxypropylene (3.3)-2,2-bis(4-hydroxyphenyl)propane, polyoxyethylene (2.0)-2,2-bis(4-hydroxyphenyl)propane, polyoxypropylene (2.0)-polyoxyethylene (2.0)-2,2-bis(4-hydroxyphenyl)propane, and polyoxypropylene (6)-2,2-bis(4-hydroxyphenyl)propane, ethylene glycol, diethylene glycol, triethylene glycol, 1,2-propylene glycol, 1,3-propylene glycol, 1,4-cyclohexanedimethanol, dipropylene glycol, polyethylene glycol, polypropylene glycol, polytetramethylene glycol, sorbitol, 1,2,3,6-hexanetetrol, 1, 4-sorbitan, pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, trimethylolpropane, 1,3,5-trihydroxymethylbenzene, isosorbide, and the like.

The alcohol monomer component preferably used among these is an aromatic diol, and preferably, the aromatic diol is contained at a proportion of 80 mol % or more in the alcohol monomer component constituting the polyester resin.

On the other hand, examples of the acid monomer components such as the carboxylic acid having a valence of 2 or more, the carboxylic acid anhydride having a valence of 2 or more, and the carboxylic acid ester having a valence of 2 or more include aromatic dicarboxylic acids such as a phthalic acid, an isophthalic acid, and a terephthalic acid, or anhydrides thereof; alkyldicarboxylic acids such as a succinic acid, an adipic acid, a sebacic acid, and an azelaic acid, or anhydrides thereof; a succinic acid or an anhydride thereof substituted with alkyl or alkenyl groups having 6 to 18 carbon atoms; and unsaturated dicarboxylic acids such as a fumaric acid, a maleic acid, and a citraconic acid, or anhydrides thereof.

The acid monomer components preferably used among these are polyvalent carboxylic acids such as a terephthalic acid, a succinic acid, an adipic acid, a fumaric acid, a trimellitic acid, a pyromellitic acid, a benzophenonetetracarboxylic acid, and anhydrides thereof.

Moreover, the acid value of the polyester resin is preferably from 1 mgKOH/g to 50 mgKOH/g from the viewpoint of the stability of a frictional electrification amount.

The acid value can be set within the above range by adjusting the type and the blending amount of the monomers used in the resin. Specifically, the acid value can be controlled by adjusting the alcohol monomer component proportion/acid monomer component proportion and the molecular weight at the time of resin production. The acid value can also be controlled by reacting the terminal alcohol with a polyvalent acid monomer (for example, a trimellitic acid) after ester condensation polymerization.

Further, a crystalline polyester can also be used as the binder resin.

Coloring Agent

The toner particle may comprise a coloring agent. The coloring agent is not particularly limited, and for example, the following known ones can be used alone or in combination.

Examples of a black coloring agent include carbon black and a black coloring agent obtained by using a yellow coloring agent, a magenta coloring agent, and a cyan coloring agent.

Examples of the magenta coloring pigment include the following. C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, 282; C. I. Pigment Violet 19; C. I. Vat Red 1, 2, 10, 13, 15, 23, 29, 35.

Examples of the magenta coloring dye include the following. Oil-soluble dyes such as C. I. Solvent Red 1, 3, 8, 23, 24, 25, 27, 30, 49, 81, 82, 83, 84, 100, 109, 121; C. I. Disperse Red 9; C. I. Solvent Violet 8, 13, 14, 21, 27; C. I. Disperse Violet 1, Basic dyes such as C. I. Basic Red 1, 2, 9, 12, 13, 14, 15, 17, 18, 22, 23, 24, 27, 29, 32, 34, 35, 36, 37, 38, 39, 40; C. I. Basic Violet 1, 3, 7, 10, 14, 15, 21, 25, 26, 27, 28.

Examples of the cyan coloring pigment include the following. C. I. Pigment Blue 2, 3, 15:2, 15:3, 15:4, 16, 17; C. I. Vat Blue 6; C. I. Acid Blue 45, a copper phthalocyanine pigment having a phthalocyanine skeleton substituted with 1 to 5 phthalimidomethyl groups.

Examples of the cyan coloring dye include C. I. Solvent Blue 70.

Examples of the yellow coloring pigment include the following. C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, 185; C. I. Vat Yellow 1, 3, 20.

Examples of the yellow coloring dye include C. I. Solvent Yellow 162.

The content of the coloring agent is preferably 3.0% by mass to 15.0% by mass in the toner particle.

Release Agent

The toner particle preferably contains wax as a release agent from the viewpoint of separability. The wax is not particularly limited, but includes, for example, the following.

Hydrocarbon waxes such as low molecular weight polyethylene, low molecular weight polypropylene, an alkylene copolymer, a microcrystalline wax, a paraffin wax, and a Fischer-Tropsch wax; oxides of the hydrocarbon waxes such as oxidized polyethylene wax or block copolymers thereof; waxes with main components of fatty acid esters such as a carnauba wax; deoxidized carnauba waxes obtained by deoxidizing fatty acid esters partially or wholly.

Furthermore, examples of the release agent include the following. Saturated straight-chain fatty acids such as a palmitic acid, a stearic acid, and a montanic acid; unsaturated fatty acids such as a brassic acid, an eleostearic acid, and a parinaric acid; saturated alcohols such as a stearyl alcohol, an aralkyl alcohol, a behenyl alcohol, a carnauvyl alcohol, a ceryl alcohol, and a melissyl alcohol; polyhydric alcohols such as sorbitol; fatty acids such as a palmitic acid, a stearic acid, a behenic acid, and a montanic acid; esters with alcohols such as a stearyl alcohol, an aralkyl alcohol, a behenyl alcohol, a carnauvyl alcohol, a ceryl alcohol, and a melissyl alcohol; fatty acid amides such as a linoleic acid amide, an oleic acid amide, and a lauric acid amide; saturated fatty acid bisamides such as a methylenebisstearic acid amide, an ethylenebiscapric acid amide, an ethylenebislauric acid amide, and a hexamethylenebisstearic acid amide; unsaturated fatty acid amides such as an ethylenebisoleic acid amide, a hexamethylenebisoleic acid amide, an N,N'dioleyladipate, and an N,N'dioleylsebacic acid amide; aromatic bisamides such as an m-xylene bisstearic acid amide and an N,N' distearyl isophthalic acid amide; aliphatic metal salts such as calcium stearate, calcium laurate, zinc stearate, and magnesium stearate (generally referred to as metal soaps); waxes obtained by grafting a vinyl monomer such as styrene or an acrylic acid to aliphatic hydrocarbon waxes; a partial esterified substance of a polyhydric alcohol and a fatty acid such as a behenic acid monoglyceride; a methyl ester compound having a hydroxyl group obtained by hydrogenation of vegetable oil and fat.

Among these release agents, the hydrocarbon waxes such as the paraffin wax and the Fischer-Tropsch wax, or the fatty acid ester waxes such as the carnauba wax are preferable from the viewpoint of improving the low temperature fixability and the hot offset resistance.

The content of the release agent is preferably 3.0% by mass to 15.0% by mass in the toner particle. When the content of the release agent is within this range, it is likely to be possible to efficiently exhibit the hot offset resistance.

Charge Control Agent

The toner particle may comprise a charge control agent. The charge control agent is not particularly limited, and known ones can be used. In particular, a charge control agent that has a high electrification speed and can stably maintain a constant electrification amount is preferable. The charge control agent may be added internally or externally to the toner particle.

Examples of the charge control agent that controls the toner particle to be negatively chargeable include the following. As an organometallic compound and a chelate compound, a monoazo metal compound, an acetylacetone metal compound, aromatic oxycarboxylic acid-based metal compounds, aromatic dicarboxylic acid-based metal compounds, oxycarboxylic acid-based metal compounds, and dicarboxylic acid-based metal compounds. Others include an aromatic oxycarboxylic acid, an aromatic mono- and polycarboxylic acid and a metal salt thereof, an anhydride, or esters, phenol derivatives such as a bisphenol, and the like. Furthermore, examples thereof include a urea derivative, metal-containing salicylic acid-based compounds, metal-containing naphthoic acid-based compounds, a boron compound, a quaternary ammonium salt, and a calixarene.

On the other hand, examples of the charge control agent that controls the toner particle to be positively chargeable include the following. Nigrosine and a nigrosine modification substance with a fatty acid metal salt; a guanidine compound; an imidazole compound; tributylbenzylammonium-1-hydroxy-4-naphthosulfonate, quaternary ammonium salts such as tetrabutylammonium tetrafluoroborate, and onium salts such as a phosphonium salt as an analogue thereof and lake pigments thereof; a triphenylmethane dye and a lake pigment thereof (as a laking agent, a phosphotungstic acid, a phosphomolybdic acid, a phosphotungstic molybdic acid, a tannic acid, a lauric acid, a gallic acid, a ferricyanide, and a ferrocyanide); a metal salt of a higher fatty acid; resin-based charge control agents.

These charge control agents can be used alone or in combination of two or more. The content of these charge control agents in the toner particle is preferably 0.01% by mass to 10% by mass.

External Additive

The toner comprises hydrotalcite particles as the external additive. The hydrotalcite particles are generally represented by the following structural formula (A).

$$M^{2+}_{y}M^{3+}_{x}(OH)_2A^{n-}_{(x/n)}\cdot mH_2O \quad (A)$$

Where $0<x\leq 0.5$, $y=1-x$, and $m\geq 0$.

$M^{2+}$ and $M^{3+}$ represent a divalent metal and a trivalent metal, respectively.

$M^{2+}$ is preferably at least one divalent metal ion selected from the group consisting of Mg, Zn, Ca, Ba, Ni, Sr, Cu, and Fe. $M^{3+}$ is preferably at least one trivalent metal ion selected from the group consisting of Al, B, Ga, Fe, Co, and In.

$A^{n-}$ is an n-valent anion, examples thereof include $CO_3^{2-}$, $OH^-$, $Cl^-$, $I^-$, $F^-$, $Br^-$, $SO_4^{2-}$, $HCO_3^-$, $CH_3COO^-$, and $NO_3^-$, and these may be present alone or in combination of a plurality of types.

The hydrotalcite particles contain at least F as $A^{n-}$. That is, the hydrotalcite particles contain fluorine. Moreover, the hydrotalcite particles preferably contain at least Al as $M^{3+}$. Moreover, it is preferable to contain at least Mg as $M^{2+}$.

Specific examples thereof include $Mg_{8.6}Al_4(OH)_{25.2}F_2CO_3\cdot mH_2O$, $Mg_{12}Al_4(OH)_{32}F_2CO_3\cdot mH_2O$, and the like.

The hydrotalcite particles may be a solid solution containing a plurality of different elements. Further, a trace amount of a monovalent metal may be included.

The hydrotalcite particle preferably further contain aluminum and more preferably further contain magnesium and aluminum.

A ratio F/Al (an elemental ratio) in an atomic concentration of the fluorine to the aluminum in the hydrotalcite particles, which is obtained from the main component mapping of the hydrotalcite particle by STEM-EDS mapping analysis of the toner, is preferably 0.02 to 0.60, more preferably 0.04 to 0.60, further preferably 0.04 to 0.30.

When F/Al is 0.02 or more, the charge-up curbing effect due to the fluorine is likely to be obtained. When F/Al is 0.60 or less, the hydrotalcite particles are less likely to be detached from the toner, resulting in better developability through long-term durable use.

F/Al can be controlled by adjusting the concentration of the fluorine during production of the hydrotalcite particles.

A ratio Mg/Al (an elemental ratio) in an atomic concentration of the magnesium to the aluminum in the hydrotalcite particles, which is obtained from the main component mapping of the hydrotalcite particle by STEM-EDS mapping analysis of the toner, is preferably 1.5 to 4.0 and more preferably 1.6 to 3.8.

Mg/Al can be controlled by adjusting the amounts of raw materials during production of the hydrotalcite.

When Mg/Al is 1.5 or more, the positive charge of the hydrotalcite particles becomes more appropriate under the influence of Al, the adhesion between the toner particle and the hydrotalcite particles is improved, and the desired microcarrier effect is easily obtained. When Mg/Al is 4.0 or less, the positive electrification property of the hydrotalcite particles as a whole is improved, and the ability to impart a charge to the toner is improved.

Moreover, the hydrotalcite particles preferably have water in their molecules and more preferably $0.1<m<0.6$ in formula (A).

When m is 0.1 or more, in a case where the toner is charged up, it is easy to neutralize and stabilize the electrification of the toner. When m is 0.6 or less, the resistance increases and the electrification property becomes better.

The number average particle diameter Dh of primary particles of the hydrotalcite particles is preferably 60 to 1,000 nm, more preferably 60 to 800 nm, and further preferably 200 to 600 nm.

In a case where the number average particle diameter Dh is 1000 nm or less, the fluidity of the toner is easily improved, and the electrification property during long-term durable use is further improved.

The hydrotalcite particles may be hydrophobized with a surface treatment agent. As the surface treatment agent, higher fatty acids, coupling agents, esters, and oils such as silicone oil can be used. Of these, higher fatty acids are preferably used, and specific examples thereof include stearic acid, oleic acid, and lauric acid.

Furthermore, the toner comprises the silica particles as the external additive.

The silica particles satisfy specific ranges of D/Q and D/(S−Q), as described above. The silica particles are preferably hydrophobized with a surface treatment agent. For example, the silica particles preferably include silica substrate particles and the surface treatment agent on the surfaces of the silica substrate particles. As the silica serving as the substrate of the silica particles, the silica particles obtained by a known method can be used without particular limitation. Typical examples thereof include fumed silica, wet silica, sol-gel silica, and the like. Further, these silicas may be partially or wholly fused silica.

It is possible to appropriately select a suitable one from the fumed silica, the wet silica, and the like according to the required properties of the individual toner and to use the selected silica. In particular, the fumed silica is excellent in the effect of imparting fluidity and is suitable as a silica substrate for use as the external additive for an electrophotographic toner.

It is preferable to use silica particles obtained by surface-treating the silica substrate for the purpose of imparting the hydrophobicity and the fluidity. Examples of the surface treatment method include a method of chemical treatment with a silicon compound that reacts with or is physically adsorbed to the silica substrate.

Examples of the silica surface treatment agent include a silane compound, a silane coupling agent, an unmodified silicone oil, various modified silicone oils, other organosilicon compounds, and the like. These treatment agents may be used alone or in combination of a plurality of types. Among these, the unmodified silicone oil is particularly preferable. Particularly preferably, the silicone oil is polydimethylsiloxane formed of the D unit with less polarization from the viewpoint of adhesion to the hydrotalcite particles containing fluorine.

That is, the silica particle is preferably silicone oil-treated silica particle whose surface is treated with the silicone oil.

In general, from the viewpoint of toner fluidity, the silica particles treated with the silicone oil are inferior to silica particles treated with HMDS or the like. However, when the toner contains the hydrotalcite particles containing fluorine as the external additives, the adhesion between the hydrotalcite particle containing fluorine and the silicone oil-treated silica particle externally added to the toner is reduced. Therefore, this is preferable because the fluidity of the toner is improved as compared with the case where the silica particles treated with HMDS or the like are externally added.

The number average particle diameter Ds of the silica particles is preferably 5 to 100 nm, more preferably 6 to 50 nm, and further preferably 7 to 40 nm. By externally adding the silica particles having a particle diameter within this range to the toner particle, it is possible to adjust the toner properties such as the electrification property and the fluidity of the toner and to obtain an excellent developing property, and the fluidity and the electrification property imparted to the toner are easily secured throughout the long-term durable use.

A ratio Dh/Ds of the number average particle diameter Dh (nm) of the hydrotalcite particles containing fluorine to the number average particle diameter Ds (nm) of the silica particles is preferably 5.0 to 200.0. The ratio is more preferably 10.0 to 100.0 and further preferably 13.0 to 60.0. When Dh/Ds is 5.0 or more, the microcarrier effect of the hydrotalcite particles containing fluorine is more easily exhibited, and the electrification rising property of the toner is further improved. On the other hand, when Dh/Ds is 200.0 or less, the fluidity of the toner is further improved.

The circularity of the silica particles is preferably less than 0.80 and more preferably from 0.70 to 0.75. When the circularity of the silica particles is less than 0.80, it is difficult for the silica particles to detach from the toner, and contamination of members is easily curbed.

Production Method for the Toner

The toner particle production method is not particularly limited, and a known method can be adopted. For example, a method for directly producing a toner in a hydrophilic medium, such as an emulsion aggregation method, a dissolution suspension method, or a suspension polymerization method, can be mentioned. Further, a pulverization method may be used, and the toner obtained by the pulverization method may be subjected to hot spheroidization.

Among them, with the toner produced by the emulsion aggregation method, the effect of the present disclosure can be easily obtained. That is, the toner particles are preferably emulsion aggregation toner particles.

The reason is that the flocculant used in the production process has polyvalent metal ions. The presence of this polyvalent metal ion in the binder resin allows the generated charge to be dispersed inside the toner, and charging performance of the toner can be further stabilized. The polyvalent metal ion is preferably at least one selected from the group consisting of aluminum ion, iron ion, magnesium ion, and calcium ion.

Hereinafter, a method for producing toner particles by the emulsion aggregation method will be exemplified and described in detail.

Dispersion Liquid Preparation Step

A binder resin particle-dispersed solution is prepared, for example, as follows. When a binder resin is a homopolymer or copolymer (vinyl resin) of a vinyl monomer, the vinyl monomer is subjected to emulsion polymerization or seed polymerization in an ionic surfactant to prepare a dispersion liquid in which vinyl resin particles are dispersed in the ionic surfactant.

When the binder resin is a resin other than a vinyl resin, such as a polyester resin, the resin is mixed in an aqueous medium in which an ionic surfactant or a polymer electrolyte is dissolved.

Thereafter, this solution is heated to the melting point or softening point of the resin to cause dissolution, and a dispersing device having a strong shearing force, such as a homogenizer, is used to prepare a dispersion liquid in which the binder resin particles are dispersed in the ionic surfactant.

The dispersing means is not particularly limited, and examples thereof include known dispersing devices such as a rotary shear type homogenizer and a ball mill, a sand mill, and a dyno mill having media.

Further, a phase inversion emulsification method may be used as a method for preparing the dispersion liquid. In the phase inversion emulsification method, a binder resin is dissolved in an organic solvent, a neutralizing agent and a dispersion stabilizer are added as necessary, an aqueous solvent is dropped under stirring to obtain emulsified particles, and the organic solvent in the resin dispersion liquid is thereafter removed to obtain an emulsion. At this time, the order of adding the neutralizing agent and the dispersion stabilizer may be changed.

The number average particle diameter of the binder resin particles is usually 1 or less, and preferably 0.01 μm to 1.00 μm. Where the number average particle diameter is 1.00 μm or less, the finally obtained toner has a suitable particle size distribution, and generation of free particles can be prevented. Further, when the number average particle diameter is within the above range, uneven distribution among the toner particles is reduced, the dispersion in the toner becomes good, and variations in performance and reliability are reduced.

In the emulsion aggregation method, a colorant particle-dispersed solution can be used as necessary. The colorant particle-dispersed solution is obtained by dispersing at least colorant particles in a dispersant. The number average particle diameter of the colorant particles is preferably 0.5 μm or less, and more preferably 0.2 μm or less. Where the number average particle diameter is 0.5 μm or less, irregular reflection of visible light can be prevented, and the binder resin particles and the colorant particles are easily aggregated in the aggregation process. Where the number average particle diameter is within the above range, uneven distribution between toners is reduced, dispersion in the toner is improved, and variations in performance and reliability are reduced.

In the emulsion aggregation method, a wax particle-dispersed solution can be used as necessary. The wax particle-dispersed solution is obtained by dispersing at least wax particles in a dispersant. The number average particle diameter of the wax particles is preferably 2.0 μm or less, and more preferably 1.0 μm or less. Where the number average particle diameter is 2.0 μm or less, the deviation in the content of wax among the toner particles is small, and the stability of the image over a long period is improved. Where the number average particle diameter is within the above range, uneven distribution between toners is reduced, dispersion in the toner is improved, and variations in performance and reliability are reduced.

The combination of the colorant particles, the binder resin particles, and the wax particles is not particularly limited and can be selected, as appropriate, depending on the purpose.

Other particle-dispersed solutions obtained by dispersing appropriately selected particles in a dispersant may be further mixed in addition to the abovementioned dispersion liquids.

The particles contained in the other particle-dispersed solutions are not particularly limited and can be selected, as appropriate, according to the purpose. Examples thereof include internal additive particles, charge control agent particles, inorganic particles, and abrasive particles. These particles may be dispersed in the binder resin particle-dispersed solution or the colorant particle-dispersed solution.

Examples of the dispersant contained in the binder resin particle-dispersed solution, the colorant particle-dispersed solution, the wax fine particle-dispersed solution, and the other particle-dispersed solutions include an aqueous medium including a polar surfactant. Examples of the aqueous medium include water such as distilled water and ion exchanged water, and alcohols. These may be used alone by one type and two or more types may be used in combination. The content of the polar surfactant cannot be generally defined and can be selected, as appropriate, according to the purpose.

Examples of the polar surfactant include anionic surfactants such as sulfuric acid esters and salts, sulfonic acid salts, phosphoric acid esters, soap, and the like; cationic surfactants such as amine salts, quaternary ammonium salts, and the like; and the like.

Specific examples of the anionic surfactant include sodium dodecylbenzenesulfonate, sodium dodecylsulfate, sodium alkylnaphthalenesulfonates, sodium dialkylsulfosuccinates and the like.

Specific examples of the cationic surfactant include alkylbenzene dimethyl ammonium chlorides, alkyl trimethyl ammonium chlorides, distearyl ammonium chloride and the like. These may be used alone by one type or two or more types may be used in combination.

These polar surfactants can be used in combination with a nonpolar surfactant. Examples of the nonpolar surfactant include nonionic surfactants based on polyethylene glycol, alkylphenol ethylene oxide adducts, and polyhydric alcohols.

The content of the colorant particles is preferably 0.1 parts by mass to 30 parts by mass with respect to 100 parts by mass of the binder resin in the aggregated particle-dispersed solution when the aggregated particles are formed.

The content of the wax particles is preferably 0.5 parts by mass to 25 parts by mass, and more preferably 5 parts by mass to 20 parts by mass with respect to 100 parts by mass of the binder resin in the aggregated particle-dispersed solution when the aggregated particles are formed.

Furthermore, in order to control the charging performance of the obtained toner more specifically, the charge control particles and the binder resin particles may be added after the aggregated particles are formed.

The particle diameter of the particles such as the binder resin particles and the colorant particles is measured using a laser diffraction/scattering particle size distribution analyzer LA-960V2 manufactured by Horiba, Ltd.

Aggregation Step

The aggregation step is performed for forming aggregated particles including binder resin particles and, if necessary, colorant particles, wax particles and the like in an aqueous medium including the binder resin particles and, if necessary, the colorant particles, the wax particles and the like.

The aggregated particles can be formed in an aqueous medium by, for example, adding and mixing a pH adjuster, a flocculant, and a stabilizer in the aqueous medium, and appropriately adjusting temperature, applying mechanical power, and the like.

Examples of pH adjusters include alkalis such as ammonia and sodium hydroxide, and acids such as nitric acid and citric acid. Examples of the flocculant include salts of monovalent metals such as sodium and potassium; salts of divalent metals such as calcium and magnesium; salts of trivalent metals such as iron and aluminum; and alcohols such as methanol, ethanol and propanol.

Examples of the stabilizer mainly include polar surfactants themselves or an aqueous medium including the same. For example, when the polar surfactant contained in each particle-dispersed solution is anionic, a cationic surfactant can be selected as the stabilizer.

The addition/mixing of the flocculant and the like is preferably performed at a temperature equal to or lower than the glass transition temperature of the resin contained in the aqueous medium. Where mixing is performed under such temperature conditions, aggregation proceeds in a stable state. Mixing can be performed using, for example, a known mixing device, a homogenizer, a mixer and the like.

In the aggregation step, second binder resin particles are adhered to the surface of the aggregated particles using the binder resin particle-dispersed solution including the second binder resin particles to form a coating layer (shell layer), thereby making it possible to obtain toner particles having a core/shell structure in which a shell layer is formed on the surface of the core particles.

The second binder resin particles used in this case may be the same as or different from the binder resin particles constituting the core particles. In addition, the aggregation step may be repeatedly implemented a plurality of times in a stepwise manner.

Fusion Step

The fusion step is a step in which the obtained aggregated particles are heated and fused. A pH adjuster, a polar surfactant, a nonpolar surfactant, or the like can be loaded, as appropriate, to prevent the toner particles from fusing before a transition is made to the fusion step.

The heating temperature may be from the glass transition temperature of the resin contained in the aggregated particles (the glass transition temperature of the resin having the highest glass transition temperature when there are two or more types of resin) to the decomposition temperature of the resin. Therefore, the temperature of the heating differs depending on the type of resin of the binder resin particles and cannot be generally defined, but is generally from the glass transition temperature of the resin contained in the aggregated particles to 140° C. In addition, heating can be performed using a publicly known heating device/implement.

As the fusion time, a short time is sufficient if the heating temperature is high, and a long time is necessary if the heating temperature is low. That is, the fusion time depends on the temperature of heating and cannot be defined in general, but is typically from 30 min to 10 h.

The toner particles obtained through each of the above steps can be solid-liquid separated according to a known method, and the toner particles can be recovered, and then washed, dried, etc. under appropriate conditions.

The volume-based median diameter of the toner particle is preferably from 3.0 μm to 10.0 μm.

External Addition Step

The toner can be obtained by adding the hydrotalcite particles and the silica particles to the obtained toner particle. Other external additives may be added to the extent that the effects of the present disclosure are not impaired, as necessary.

A methods for measuring each physical property will be described below.

Method for Measuring Number Average Particle Diameter Ds of Primary Particles of Silica Particles and Number Average Particle Diameter of Primary Particles of Hydrotalcite Particles A photograph of the toner surface is taken at a magnification of 100,000 times using an FE-SEM S-4800 (manufactured by Hitachi Ltd.). Using the enlarged photograph, the particle diameter of the primary particles of 100 or more silica particles is measured, and the number average particle diameter (Ds) of the silica particles is obtained from the arithmetic mean.

The number average particle diameter of the hydrotalcite particles is measured by combining the scanning electron microscope "S-4800" (a trade name, manufactured by Hitachi, Ltd.) and elemental analysis through the energy dispersive X-ray spectroscopy (EDS). The toner to which the external additive is externally added is observed, and the hydrotalcite particles are photographed in a field magnified up to 200,000 times. The hydrotalcite particles are selected from the photographed image, and the major diameters of the primary particles of 100 hydrotalcite particles are randomly measured to calculate the number average particle diameter Dh. The observation magnification is appropriately adjusted according to the size of the external additive. Here, as a result of observation, a particle that looks like a single particle is determined to be a primary particle.

In a case where the silica particles or the hydrotalcite particles containing fluorine before external addition are available, the number average particle diameter can be calculated by the above method using them.

In a case where the shape of the particle is spherical, the absolute maximum length is counted as the particle diameter, and in a case where the shape of the particle has a long diameter and a short diameter, the long diameter is counted as the particle diameter.

Moreover, the hydrotalcite particles on the toner surface can be distinguished by the following method.

Method for Identifying Silica Particles and Hydrotalcite Particles

Identification of the silica particles and the hydrotalcite particles can be performed by combining shape observation by scanning the electron microscope (SEM) and elemental analysis by the energy dispersive X-ray spectroscopy (EDS).

Using the scanning electron microscope "S-4800" (a trade name, manufactured by Hitachi Ltd.), the toner is observed in a field magnified up to 50,000 times. The external additive to be discriminated is observed by focusing on the toner particle surface. The EDS analysis is performed on the external additive to be discriminated, and the silica particles and the hydrotalcite particles can be identified from the type of an elemental peak.

When an element peak of at least one metal selected from the group consisting of Mg, Zn, Ca, Ba, Ni, Sr, Cu, and Fe and an element peak of at least one metal selected from the group consisting of Al, B, Ga, Fe, Co, and In, which are metals that can constitute a hydrotalcite particle, are observed as the element peaks, the presence of a hydrotalcite particle including metals of the two kinds can be estimated.

In the case of the silica particles, the existence of the silica particles can be inferred from the observation of Si and O elemental peaks.

Specimens of the hydrotalcite particles and the silica particles presumed by the EDS analysis are separately prepared, and the shape observation by the SEM and the EDS analysis are performed. The analysis results of the specimens are compared with the analysis result of the particles to be discriminated in order to determine whether or not they match each other, and thus it is determined whether or not they are the hydrotalcite particles and the silica particles.

Method for Measuring Elemental Ratio of Hydrotalcite Particles and Method for Analyzing Fluorine and Aluminum Inside Hydrotalcite Particles The elemental ratio of the hydrotalcite particles is measured through EDS mapping measurement of the toner using a scanning transmission electron microscope (STEM). In the EDS mapping measurement, spectral data for each picture element (pixel) in the analysis area is used. EDS mapping can be measured with high sensitivity by using a silicon drift detector with a large detection element area.

By statistically analyzing the spectral data of each pixel obtained through the EDS mapping measurement, main component mapping in which pixels with similar spectra are extracted can be obtained, enabling mapping with specified components.

A sample for observation is prepared according to the following procedure.

0.5 g of the toner is weighed and placed in a cylindrical mold with a diameter of 8 mm using a Newton press under a load of 40 kN for 2 minutes to prepare a cylindrical toner pellet with a diameter of 8 mm and a thickness of about 1 mm. 200 nm thick flakes are produced from the toner pellet by an ultramicrotome (Leica, FC7).

STEM-EDS analysis is performed using the following device and conditions.

Scanning transmission electron microscope: JEM-2800 manufactured by JEOL Ltd. EDS detector: JED-2300T dry SD100GV detector (detection element area: 100 $mm^2$) manufactured by JEOL Ltd.

EDS analyzer: NORAN System 7 manufactured by Thermo Fisher Scientific Ltd.

STEM-EDS Conditions

STEM acceleration voltage: 200 kV

Magnification: 20,000 times

Probe size 1 nm

STEM image size: 1024×1024 pixels (to obtain an EDS elemental mapping image at the same position)

EDS mapping size: 256×256 pixels, Dwell Time: 30 μs, accumulation count: 100 frames Each elemental ratio in the hydrotalcite particles based on multivariate analysis is calculated as follows.

The EDS mapping is obtained by the above STEM-EDS analyzer. Next, the multivariate analysis is performed on the collected spectral mapping data using a COMPASS (PCA) mode in a measurement command of the NORAN System 7 described above to extract a main component map image.

At that time, the setting values are as follows.

Kernel size: 3×3 pixels

Quantitative map setting: high (late)

Filter fit type: high precision (slow)

At the same time, through this operation, the area ratio of each extracted main component in the EDS measurement field is calculated. Quantitative analysis is performed on the EDS spectrum of the obtained main component mapping by a Cliff-Lorimer method.

The toner particle portion and the hydrotalcite particles are distinguished on the basis of the above quantitative analysis results of the obtained STEM-EDS main component mapping. The particles can be identified as the hydrotalcite particles from the particle size, the shape, the content of polyvalent metals such as aluminum and magnesium, and the amount ratio thereof.

Further, in a case where the fluorine is present inside the hydrotalcite particles, it can be determined that the fluorine is present inside the hydrotalcite particles by the means which will be described below.

Method for Analyzing Fluorine and Aluminum in Hydrotalcite Particles

On the basis of the mapping data of the STEM-EDS mapping analysis obtained by the method described above, the hydrotalcite particles are analyzed for the fluorine and the aluminum. Specifically, the EDS line analysis is performed in a direction normal to the outer periphery of the hydrotalcite particles to analyze the fluorine and the aluminum present inside the particles.

A schematic diagram of the line analysis is shown in FIG. 1A. For the hydrotalcite particles 3 adjacent to the toner particle 1 and the toner particle 2, line analysis is performed in a direction normal to the outer periphery of the hydrotalcite particles 3, that is, in a direction of 5. Reference sign 4 indicates a boundary between the toner particles.

A range in which hydrotalcite particles is present in an acquired STEM image is selected with a rectangular selection tool, and the line analysis is performed under the following conditions.

Line Analysis Conditions

STEM magnification: 800,000 times

Line length: 200 nm

Line width: 30 nm

The number of line divisions: 100 points (intensity measurement every 2 nm)

In a case where the elemental peak intensity of the fluorine or the aluminum is 1.5 times or more the background intensity in the EDS spectrum of the hydrotalcite particles, and in a case where the elemental peak intensity of the fluorine or the aluminum at each of both end portions (a point a and a point b in FIG. 1A) of the hydrotalcite particles in the line analysis does not exceed 3.0 times the peak intensity at a point c, the element is determined to be contained inside the hydrotalcite particles. The point c is a midpoint of a line segment ab (that is, a midpoint between both end portions).

Figure 1B:
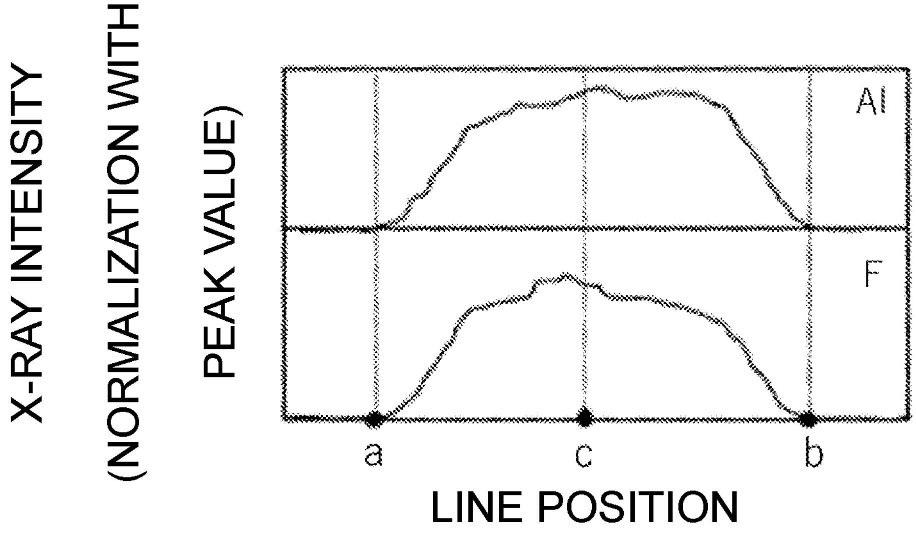
Figure 1C:
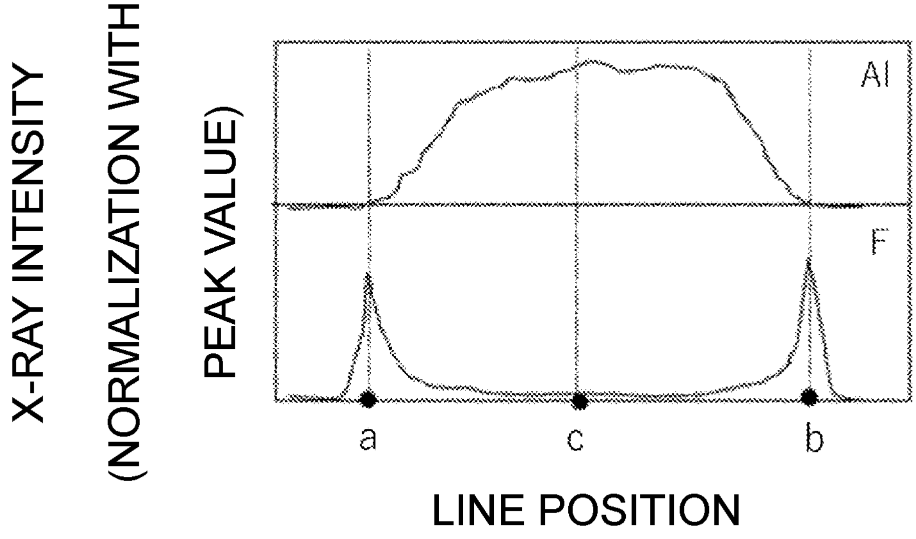

Examples of X-ray intensities of the fluorine and the aluminum obtained through the line analysis are shown in FIGS. 1B and 1C. In a case where the hydrotalcite particles contain the fluorine and the aluminum inside, a graph of the X-ray intensity normalized with the peak intensity shows a shape as shown in FIG. 1B. In a case where the hydrotalcite particles contain fluorine derived from the surface treatment agent, a graph of the X-ray intensity normalized with the peak intensity has a peak near each of the points a and b at both end portions in a graph of the fluorine as shown in FIG. 1C. By checking the X-ray intensity derived from the fluorine and the aluminum in the line analysis, it can be verified that the hydrotalcite particles contain the fluorine and the aluminum inside.

Method for Calculating Ratio (Elemental Ratio) F/Al in Atomic Concentration of Fluorine to Aluminum in Hydrotalcite Particles By acquiring a ratio F/Al (an elemental ratio) in an atomic concentration of the fluorine to the aluminum in the hydrotalcite particles, which is obtained from the main component mapping derived from the hydrotalcite particle through the STEM-EDS mapping analysis described above, in a plurality of fields, and by obtaining an arithmetic average of 100 or more particles, the ratio (the elemental ratio) F/Al in the atomic concentration of the fluorine to the aluminum in the hydrotalcite particles is obtained.

Method for Calculating Ratio (Elemental Ratio) Mg/Al in Atomic Concentration of Magnesium to Aluminum in Hydrotalcite Particles The same method as the above-described method for calculating a ratio (an elemental ratio) F/Al in an atomic concentration of the fluorine to the aluminum in the hydrotalcite particles is performed for the magnesium and the aluminum, and thus the ratio (the elemental ratio) Mg/Al in an atomic concentration of the magnesium to the aluminum in the hydrotalcite particle is calculated.

Method for Measuring Circularity of Silica Particles

To measure the circularity of the silica particles, calculation is performed by using image analysis software ImageJ (developed by Wayne Rashand) to analyze a toner surface observation image captured with Hitachi Ultra High Resolution Field Emission Scanning Electron Microscope S-4800 (Hitachi High-Technologies Corporation). The measurement procedure is shown below.

(1) Sample Preparation

A thin layer of conductive paste is applied to a sample table (aluminum sample table 15 mm×6 mm), and a toner is deposited thereon. Using a blower, the excess toner is air blown followed by sufficient drying. The sample stage is set on the sample holder.

(2) S-4800 Observation Conditions

Observation conditions are shown below.

Acceleration voltage: 0.8 kV

Emission current: 20 μA

Detector: [on SE (U)], [+BSE (L.A.100)]

Probe current: [Normal]

Focus mode: [UHR]

WD: [3.0 mm]

(3) Image Storage

Brightness is adjusted in an ABC mode, and an image is captured with a size of 640×480 pixels and saved. The following analysis is performed using this image file. At this time, a relatively flat portion of the toner surface (a visual field in which the entire observation surface is in focus) is selected to obtain an image. The observation magnification is appropriately adjusted according to the size of the particle that is the observation target.

(4) Image Analysis

From the obtained SEM observation image, the circularity is calculated using image processing software ImageJ (developer Wayne Rashand). The calculation procedure is shown below.

[1] A scale is set with [Analyze]-[Set Scale].

[2] A threshold is set with [Image]-[Adjust]-[Threshold]. (It is set to a value at which no noise remains and the inorganic fine particles to be measured remain.)

[3] In [Image]-[Crop], the measured image portion of the silica particles is selected.

[4] The overlapping particles are erased by image editing.

[5] The monochrome image is inverted with [Edit]-[Invert].

[6] [Area] and [Shape Descriptors] are checked with [Analyze]-[Set Measurements]. Also,

[Redirect to] is set to [None], and

[Decimal Place (0-9)] is set to 3.

[7] The area of the particle is indicated to be 0.0003 $\mu m^2$ or more and analysis is performed with [Analyze]-[Analyze Particle].

[8] The value of circularity of each particle is obtained.

[9] Measurement is performed on 100 or more particles observed, and an arithmetic average value of the obtained circularity is calculated to obtain circularity.

The measurement can be performed in the same manner for a toner in which a plurality of types of fine particles is contained on the toner particle surface. When the reflected electron image is observed in S-4800, the elements of each particle can be specified using identification method described above. Further, it is possible to select particles of the same kind from the shape characteristics and the like. By performing the above measurement on articles of the same kind, the circularity of particles for each kind can be calculated. Similarly, the above-described measurement of the number average particle diameter (Ds, Dh) can be performed for particles of each kind.

Where the silica particles before external addition are available, the circularity can also be calculated by the above method by using such particles.

Method for Calculating D/Q and D/(S−Q) Through Solid-State $^{29}$Si-NMR DD/MAS Measurement of Silica Particles The solid-state $^{29}$Si-NMR measurement of the silica particles are performed after the silica particles are separated from the toner surface. A method for separating the silica particles from the toner surface and the solid-state $^{29}$Si-NMR measurement will be described below.

Method for Separating Silica Particles from Toner Surface

In a case where the silica particles separated from the surface of the toner are used as the measurement sample, the separation of the silica particles from the toner is performed in the following procedure.

1.6 kg of sucrose (manufactured by Kishida Chemical Co., Ltd.) is added to 1 L of ion-exchanged water and dissolved in a hot water bath to prepare a concentrated sucrose solution. 31 g of the concentrated sucrose solution and 6 mL of Contaminon N (a 10% by mass aqueous solution of a neutral detergent for cleaning precision measuring instruments at pH 7 formed of a nonionic surfactant, an anionic surfactant, and an organic builder, manufactured by Wako Pure Chemical Industries, Ltd.) are put in a centrifugation tube to prepare a dispersion liquid. 10 g of the toner is added to this dispersion liquid, and the lumps of the toner are loosened with a spatula or the like.

The centrifugation tube is set in a "KM Shaker" (model: V. SX) manufactured by Iwaki Sangyo Co., Ltd. and shaken for 20 minutes at 350 reciprocations per minute. After shaking, the solution is replaced in a swing rotor glass tube (50 mL) and centrifugally separated in a centrifuge at 3500 rpm for 30 minutes.

In the glass tube after centrifugation, the toner particle is present in the uppermost layer, and an inorganic fine particle mixture containing the silica particles is present on a side of the aqueous solution in the lower layer. The aqueous solution in the upper layer and the aqueous solution in the lower layer are separated from each other and dried to obtain the toner particle from the upper layer side and the inorganic fine particle mixture from the lower layer side. The above centrifugation step is repeated such that the total amount of the inorganic fine particle mixture obtained from the lower layer side is 10 g or more.

Subsequently, 10 g of the obtained inorganic fine particle mixture is put into a dispersion liquid containing 100 mL of ion-exchanged water and 6 mL of the Contaminon N to be dispersed. The obtained dispersion liquid is replaced in a swing rotor glass tube (50 mL) and centrifugally separated in a centrifuge at 3500 rpm for 30 minutes.

In the glass tube after centrifugation, the silica particles are present in the uppermost layer, and other inorganic fine particles are present on a side of the aqueous solution in the lower layer. The aqueous solution in the upper layer is collected, and a centrifugal separation operation is repeated as necessary. After sufficient separation is performed, the dispersion liquid is dried, and the silica particles are collected.

Next, the solid-state $^{29}$Si-NMR measurement of the silica particles recovered from the toner particle is performed under the following measurement conditions.

DD/MAS Measurement Conditions for Solid-State $^{29}$Si-NMR Measurement

The DD/MAS measurement conditions for the solid-state $^{29}$Si-NMR measurement are as follows.

Device: JNM-ECX5002 (JEOL RESONANCE)
Temperature: room temperature
Measurement method: DD/MAS method $^{29}$Si 45°
Sample tube: Zirconia 3.2 mmφ
Sample: filled in test tube in powder form
Sample rotation speed: 10 kHz
Relaxation delay: 180 s
Scan: 2,000

After the above measurement, curve fitting is made for a plurality of silane components having different substituent groups and bonding groups from the solid-state $^{29}$Si-NMR spectrum of the silica particles, and the peaks are separated into the following M unit, D unit, T unit, and Q unit.

The curve fitting is performed using EXcalibur for Windows (a registered trademark) version 4.2 (EX series) which is software for JNM-EX400 manufactured by JEOL Ltd. When "1D Pro" is clicked from a menu icon, measurement data is read. Next, when "Curve fitting function" is selected from "Command" on a menu bar, the curve fitting is performed. The curve fitting is performed for each component such that a difference (a composite peak difference) between a composite peak obtained by combining the peaks obtained by the curve fitting and a peak of the measurement result is minimized.

M unit: $(R_i)(R_j)(R_k)SiO_{1/2}$ Formula (4)

D unit: $(R_g)(R_h)Si(O_{1/2})_2$ Formula (5)

T unit: $R_mSi(O_{1/2})_3$ Formula (6)

Q unit: $Si(O_{1/2})_4$ Formula (7)

($R_i$, $R_j$, $R_k$, $R_g$, $R_h$, and $R_m$, in formulas (4), (5), and (6) indicate an alkyl group such as a hydrocarbon group having 1 to 6 carbon atoms, a halogen atom, a hydroxy group, an acetoxy group, and an alkoxy group, which are bonded to silicon.)

After the peak separation, the integrated value of the D units that are present in a range of −25 to −15 ppm of the chemical shift and the integrated value of the Q units that are present in a range of −130 ppm to −85 ppm of the chemical shift are calculated, and the ratio D/Q is calculated. Further, the integrated value M of the M units that are present in a range of 10 ppm to 25 ppm is calculated. Furthermore, the sum S of all integrated values of M, D, T, and Q units which are present in a range of −140 to 100 ppm is calculated, and D/(S−Q) and M/S are calculated.

Measurement of Contents of Silica Particles and Hydrotalcite Particles

The contents of the silica particles and the hydrotalcite particles are calculated from the intensity of metal elements derived from the silica particles and the hydrotalcite particles using an X-ray fluorescence spectrometer (XRF). The content Ws of the silica particles can be analyzed from the Si element intensity to be calculated using a calibration curve method, and the content Wh of the hydrotalcite particles containing fluorine can be analyzed from the intensity of the element specified through the STEM-EDS mapping analysis to be calculated using a calibration curve method. The measurement procedure will be shown below.

A wavelength dispersive X-ray fluorescence spectrometer "Axios" (manufactured by PANalytical Ltd.) as a measurement device and software "SuperQ ver. 4.0F" (manufactured by PANalytical Ltd.) accompanied for setting measurement conditions and analyzing measurement data are used. Rh is used as the anode of an X-ray tube, the measurement atmosphere is vacuum, and a measurement diameter (a collimator mask diameter) is 27 mm. Further, a proportional counter (PC) is used to measure light elements, and a scintillation counter (SC) is used to measure heavy elements.

As a pellet for creating a calibration curve for calculating the content of the silica particles, a pellet having a thickness of 2 mm and a diameter of 39 mm obtained by adding 0.10 parts by mass of the silica particles recovered from the toner to 100 parts by mass of a binder [a trade name: Spectro Blend, components: C81.0, O2.9, H13.5, N2.6 (% by mass), chemical formula: $C_{19}H_{38}ON$, shape: powder (44 μm); manufactured by Rigaku Corporation], putting 4 g of the mixture sufficiently mixed using a coffee mill into a dedicated aluminum ring for pressing to be leveled, and pressing the mixture at 20 MPa for 60 seconds using a tablet press "BRE-32" (manufactured by Mayekawa Test Instruments Co., Ltd.) is prepared.

In the same manner, pellets obtained by mixing the silica particles to be 0.50 parts by mass, 1.00 parts by mass, 5.00 parts by mass, and 10.00 parts by mass are manufactured, the count rate (unit: cps) of a Si-Kα ray observed at a diffraction angle (2θ)=109.08° when PET is used as a spectral crystal is measured, and the content of the silica particles is measured using the following calibration curve. At that time, the acceleration voltage and the current value of an X-ray generator are set to 24 kV and 100 mA, respectively, and the measurement time is set to 10 seconds.

A calibration curve having a linear function is obtained with the obtained X-ray count rate as a vertical axis and the silica particle content in each calibration curve sample as a horizontal axis.

Next, the count rate of the Si-Kα ray is similarly measured for the toner particle. Then, the content Ws of the silica particles is obtained from the obtained calibration curve.

Similarly, the content Wh of the hydrotalcite particles can also be analyzed from the intensity of the element specified through the STEM-EDS mapping analysis to be calculated.

Method for Measuring Volume-Based Median Diameter of Toner

The volume-based median diameter of the toner is calculated as follows. As a measuring device, a precision particle size distribution measuring device "Coulter Counter Multisizer 3" (registered trademark, manufactured by Beckman Coulter, Inc.) using a pore electrical resistance method and equipped with a 100 μm aperture tube is used. For setting the measurement conditions and analyzing the measurement data, the dedicated software "Beckman Coulter Multisizer 3 Version 3.51" (manufactured by Beckman Coulter, Inc.) provided with the device is used. The measurements are carried out using 25,000 effective measurement channels, and then measurement data is analyzed and calculated.

As the electrolytic aqueous solution used for the measurement, a solution obtained by dissolving special grade sodium chloride in ion-exchanged water to a concentration of about 1% by mass, for example, "ISOTON II" (manufactured by Beckman Coulter, Inc.), can be used.

The dedicated software was set up in the following way before carrying out measurements and analysis.

On the "Standard Operating Method (SOMME) alteration" screen in the dedicated software, the total count number in control mode is set to 50,000 particles, the number of measurements is set to 1, and the Kd value is set to the value obtained by using "standard particle 10.0 μm" (Beckman Coulter). By pressing the "Threshold value/noise level measurement button", threshold values and noise levels are automatically set. In addition, the current is set to 1600 μA, the gain is set to 2, the electrolyte solution is set to ISOTON II, and the "Flush aperture tube after measurement" option is checked. On the "Conversion settings from pulse to particle diameter" screen in the dedicated software, the bin interval is set to logarithmic particle diameter, the particle diameter bin is set to 256 particle diameter bin, and the particle diameter range is set to from 2 μm to 60 μm. The specific measurement method is as follows.

1. 200 mL of the aqueous electrolyte solution is placed in a dedicated Multisizer 3 250 mL glass round bottomed beaker, the beaker is set on a sample stand, and a stirring rod is rotated anticlockwise at a rate of 24 rotations/second. By carrying out the "Aperture tube flush" function of the dedicated software, dirt and bubbles in the aperture tube are removed.
2. Approximately 30 mL of the aqueous electrolyte solution is placed in a 100 mL glass flat bottomed beaker. Approximately 0.3 mL of a diluted liquid, which is obtained by diluting "Contaminon N" (a 10 mass % aqueous solution of a neutral detergent for cleaning precision measurement equipment, which has a pH of 7 and comprises a non-ionic surfactant, an anionic surfactant and an organic builder, available from Wako Pure Chemical Industries, Ltd.) approximately 3-fold in terms of mass with ion exchanged water, is added to the beaker as a dispersant.
3. An ultrasonic wave disperser (Ultrasonic Dispersion System Tetra 150 produced by Nikkaki Bios Co., Ltd.) having an electrical output of 120 W, in which two oscillators having an oscillation frequency of 50 kHz are housed so that their phases are staggered by 180° is prepared. Approximately 3.3 L of ion exchanged water is placed in a water bath in the ultrasonic dispersion system, and approximately 2 mL of Contaminon N is added to this water bath.
4. The beaker mentioned in step (2) above is placed in a beaker-fixing hole in the ultrasonic wave disperser, and the ultrasonic wave disperser is activated. The height of the beaker is adjusted so that the resonant state of the liquid surface of the aqueous electrolyte solution in the beaker is at a maximum.
5. While the aqueous electrolyte solution in the beaker mentioned in section (4) above is being irradiated with ultrasonic waves, approximately 10 mg of toner is added a little at a time to the aqueous electrolyte solution and dispersed therein. The ultrasonic wave dispersion treatment is continued for a further 60 seconds. When carrying out the ultrasonic wave dispersion, the temperature of the water bath is adjusted as appropriate to a temperature of from 10° C. to 40° C.
6. The aqueous electrolyte solution mentioned in section (5) above, in which the toner is dispersed, is added dropwise by means of a pipette to the round bottomed beaker mentioned in section (1) above, which is disposed on the sample stand, and the measurement concentration is adjusted to approximately 5%. Measurements are carried out until the number of particles measured reaches 50,000.

(7) The measurement data is analyzed with the dedicated software accompanied with the device to calculate the volume-based median diameter.

EXAMPLE

The present invention will be described in more detail hereinbelow with reference to Examples and Comparative Examples, but the present invention is not limited thereto. Unless otherwise specified, the parts used in the examples are based on mass.

Production Example of Silica Particles 1

Untreated dry silica (a BET specific surface area: 380 $m^2/g$) was put into a reaction container as a silica substrate and heated to 270° C. in a fluidized state by stirring. The inside of the reactor was replaced with nitrogen gas, the reactor was sealed, and 30 parts of dimethylsilicone oil (KF-96-50CS manufactured by Shin-Etsu Chemical Co., Ltd.) was sprayed to 100 parts of the silica substrate using a spray nozzle. After the spraying, silica particles 1 were obtained by carrying out coating treatment by stirring for 1 hour while maintaining the above temperature. Table 1 shows the physical properties of the silica particles 1.

Production Example of Silica Particles 2

Silica particles 2 were obtained by carrying out the same treatment as in the production example of the silica particles 1 except that the BET specific surface area of the untreated dry silica was 50 $m^2/g$ and the amount of the dimethylsilicone oil was 7 parts. Table 1 shows the physical properties of the silica particles 2.

Production Example of Silica Particles 3

Silica particles 3 were obtained by carrying out the same treatment as in the production example of the silica particles 1 except that the amount of the dimethylsilicone oil was 45 parts. Table 1 shows the physical properties of the silica particles 3.

Production Example of Silica Particles 4

Silica particles 4 were obtained by carrying out the same treatment as in the production example of the silica particles 1 except that the BET specific surface area of the untreated dry silica was 200 $m^2/g$ and the amount of the dimethylsilicone oil was 20 parts. Table 1 shows the physical properties of the silica particles 4.

Production Example of Silica Particles 5

Silica particles 5 were obtained by carrying out the same treatment as in the production example of the silica particles 4 except that the amount of the dimethylsilicone oil was 25 parts. Table 1 shows the physical properties of the silica particles 5.

Production Example of Silica Particles 6

Silica particles 6 were obtained by carrying out the same treatment as in the production example of the silica particles 4 except that the amount of the dimethylsilicone oil was 7 parts. Table 1 shows the physical properties of the silica particles 6.

Production Example of Silica Particles 7

Silica particles 7 were obtained by carrying out the same treatment as in the production example of the silica particles 4 except that the amount of the dimethylsilicone oil was 45 parts. Table 1 shows the physical properties of the silica particles 7.

Production Example of Silica Particles 8

Silica particles 8 were obtained by carrying out the same treatment as in the production example of the silica particles 1 except that the amount of the dimethylsilicone oil was 25 parts. Table 1 shows the physical properties of the silica particles 8.

Production Example of Silica Particles 9

Silica particles 9 were obtained by carrying out the same treatment as in the production example of the silica particles 4 except that the amount of the dimethylsilicone oil was 30 parts. Table 1 shows the physical properties of the silica particles 9.

Production Example of Silica Particles 10

Silica particles 10 were obtained by carrying out the same treatment as in the production example of the silica particles 1 except that the amount of the dimethylsilicone oil was 40 parts. Table 1 shows the physical properties of the silica particles 10.

Production Example of Silica Particles 11

589.6 g of methanol, 42.0 g of water, and 47.1 g of 28% by mass aqueous ammonia were put into a 3 L glass reactor equipped with a stirrer, a dropping funnel, and a thermometer and mixed with each other. The obtained solution was adjusted to be 35° C., and 1100.0 g of tetramethoxysilane and 395.2 g of 5.4% by mass ammonia water were simultaneously started to be added to the solution while the solution was stirred. The tetramethoxysilane was dropped over 6 hours, and the ammonia water was dropped over 5 hours.

After the dropping was completed, stirring was continued for 0.5 hour for hydrolysis to obtain a methanol-water dispersion liquid of hydrophilic spherical sol-gel silica particles. Then, an ester adapter and a cooling tube were attached to the glass reactor, and the dispersion liquid was sufficiently dried at 80° C. under a reduced pressure. The obtained sol-gel silica particles were heated in a constant temperature bath at 400° C. for 10 minutes.

The sol-gel silica particles obtained by performing the above steps multiple times were deagglomerated using a pulverizer (manufactured by Hosokawa Micron Corporation).

Silica particles 11 were obtained by carrying out the same treatment as in the production example of the silica particles 1 except that the untreated dry silica was changed to the sol-gel silica particles obtained by the above procedure and the amount of the dimethylsilicone oil was 15 parts. Table 1 shows the physical properties of the silica particles 11.

Production Example of Silica Particles 12

Untreated dry silica (a BET specific surface area: 380 $m^2/g$) was put into a reaction container and heated to 150° C. in a fluidized state by stirring. The inside of the reactor was replaced with nitrogen gas, the reactor was sealed, and 20 parts of hexamethyldisilazane (HMDS) as a first surface treatment agent was sprayed to 100 parts of the silica substrate using a spray nozzle to be mixed therewith. After that, the mixture was continually heated and stirred for 1 hour, and then 10 parts of dimethylsilicone oil (KF-96-100CS manufactured by Shin-Etsu Chemical Co., Ltd.) as a second surface treatment agent was sprayed to the mixture, and the mixture was further heated and stirred in the same manner for 1 hour to obtain silica particles 12. Table 1 shows the physical properties of the silica particles 12.

Production Example of Silica Particles 13

A total of 500 parts of methanol and 70 parts of water adjusted to pH 5.4 using 10% by mass hydrochloric acid were dropped and mixed in a 1.5 L glass reaction vessel equipped with a stirrer, a dropping nozzle, and a thermometer to obtain a catalyst solution. After the catalyst solution was adjusted to 30° C., 100 parts of tetramethoxysilane and 20 parts of 8.0% by mass ammonia water were dropped simultaneously over 60 min while stirring to obtain a hydrophilic silica fine particle-dispersed solution.

Thereafter, the obtained silica particle-dispersed solution was concentrated to a solid fraction concentration of 40% by mass with a rotary filter R-Fine (manufactured by Kotobuki Industries Co., Ltd.) to obtain a silica particle-dispersed solution. A total of 50 parts of hexamethyldisilazane (HMDS) as a hydrophobizing agent was added to 250 parts of the silica particle-dispersed solution in a reaction container, a reaction was conducted at 130° C. for 2 h, and the reaction product was cooled and dried by spray drying to obtain silica particles 13. Table 1 shows the physical properties of the silica particles 13.

Production Example of Silica Particles 14

Silica particles 14 were obtained by carrying out the same treatment as in the production example of the silica particles 1 except that the amount of the dimethylsilicone oil was 55 parts. Table 1 shows the physical properties of the silica particles 14.

obtain a raw material hydrotalcite slurry. The concentration of the hydrotalcite in the obtained hydrotalcite slurry was 5.6% by mass.

The obtained hydrotalcite slurry was vacuum dried overnight at 40° C. NaF was dissolved in the ion-exchanged water to have a concentration of 100 mg/L, a solution adjusted to pH 7.0 using 1 mol/L of HCl or 1 mol/L of NaOH was prepared, and the dried hydrotalcite was added to the adjusted solution at a proportion of 0.1% (w/v %). Stirring was carried out at a constant speed for 48 hours using a magnetic stirrer to prevent sedimentation. Then, the hydrotalcite slurry was filtered through a membrane filter with a pore size of 0.5 μm and washed with the ion-exchanged water. The obtained hydrotalcite was vacuum dried overnight at 40° C. and then deagglomerated. Table 2 shows the composition and the physical properties of the obtained hydrotalcite particles 1.

Preparation of Hydrotalcite Particles 2 to 13

Hydrotalcite particles 2 to 13 were obtained in the same manner as in the production example of the hydrotalcite particles 1 except that A liquid:B liquid and the concentration of NaF aqueous solution were appropriately adjusted. Table 2 shows the compositions and the physical properties of the obtained hydrotalcite particles 2 to 13.

TABLE 1

| | M | D | T | Q | D/Q | D/(S − Q) | Particle diameter | Circularity |
|---|---|---|---|---|---|---|---|---|
| Silica particles 1 | 0.000 | 0.220 | 0.000 | 0.780 | 0.28 | 1.00 | 7 | 0.72 |
| Silica particles 2 | 0.000 | 0.050 | 0.000 | 0.950 | 0.05 | 1.00 | 40 | 0.75 |
| Silica particles 3 | 0.000 | 0.333 | 0.000 | 0.667 | 0.50 | 1.00 | 10 | 0.78 |
| Silica particles 4 | 0.008 | 0.160 | 0.000 | 0.832 | 0.19 | 0.95 | 12 | 0.74 |
| Silica particles 5 | 0.005 | 0.195 | 0.000 | 0.800 | 0.24 | 0.98 | 15 | 0.73 |
| Silica particles 6 | 0.000 | 0.050 | 0.000 | 0.950 | 0.05 | 1.00 | 12 | 0.71 |
| Silica particles 7 | 0.000 | 0.333 | 0.000 | 0.667 | 0.50 | 1.00 | 18 | 0.74 |
| Silica particles 8 | 0.000 | 0.180 | 0.000 | 0.820 | 0.22 | 1.00 | 7 | 0.72 |
| Silica particles 9 | 0.010 | 0.200 | 0.000 | 0.790 | 0.25 | 0.95 | 12 | 0.74 |
| Silica particles 10 | 0.015 | 0.300 | 0.000 | 0.685 | 0.44 | 0.95 | 8 | 0.74 |
| Silica particles 11 | 0.000 | 0.100 | 0.000 | 0.900 | 0.11 | 1.00 | 100 | 0.92 |
| Silica particles 12 | 0.110 | 0.070 | 0.000 | 0.820 | 0.09 | 0.39 | 7 | 0.75 |
| Silica particles 13 | 0.100 | 0.000 | 0.000 | 0.900 | 0.00 | 0.00 | 30 | 0.90 |
| Silica particles 14 | 0.000 | 0.400 | 0.000 | 0.600 | 0.67 | 1.00 | 8 | 0.70 |

In the table, each of M, D, T, and Q indicates the proportion of the peak area of each of the M unit, the D unit, the T unit, and the Q unit when the sum S of the peak area in the M unit, the peak area in the D unit, the peak area in the T unit, and the peak area in the Q unit which are obtained by the solid-state $^{29}$Si-NMR DD/MAS method is 1.00. Therefore, M/S is the same value as M. The particle diameter indicates the number average particle diameter Ds (nm) of the primary particles.

Preparation of Hydrotalcite Particles 1

A mixed aqueous solution of 1.03 mol/L of magnesium chloride and 0.239 mol/L of aluminum sulfate (A liquid), a 0.753 mol/L of sodium carbonate aqueous solution (B liquid), and 3.39 mol/L of sodium hydroxide aqueous solution (C liquid) was prepared.

Next, A liquid, B liquid, and C liquid were poured into the reaction tank at a flow rate that would give a volume ratio of 4.5:1 of A liquid:B liquid using a metering pump, a pH value of the reaction liquid was maintained in the range of 9.3 to 9.6 with C liquid, and the reaction temperature was 40° C. to form a precipitate. After filtration and washing, the precipitate was re-emulsified with ion-exchanged water to Preparation of Hydrotalcite Particles 14

Hydrotalcite particles 14 were obtained in the same manner as in the production example of the hydrotalcite particles 1 except that the ion-exchanged water was used instead of the NaF aqueous solution in the production example of the hydrotalcite particles 1. Table 2 shows the composition and the physical properties of the obtained hydrotalcite particles 14.

TABLE 2

| | Mg/Al ratio | F/Al ratio | Average particle diameter (nm) |
|---|---|---|---|
| Hydrotalcite particles 1 | 2.2 | 0.12 | 400 |
| Hydrotalcite particles 2 | 1.8 | 0.11 | 400 |
| Hydrotalcite particles 3 | 3.8 | 0.12 | 400 |
| Hydrotalcite particles 4 | 1.6 | 0.12 | 400 |
| Hydrotalcite particles 5 | 2.1 | 0.60 | 400 |
| Hydrotalcite particles 6 | 2.1 | 0.32 | 400 |
| Hydrotalcite particles 7 | 2.1 | 0.04 | 400 |
| Hydrotalcite particles 8 | 2.1 | 0.02 | 400 |
| Hydrotalcite particles 9 | 2.1 | 0.11 | 800 |
| Hydrotalcite particles 10 | 2.1 | 0.11 | 100 |

TABLE 2-continued

| | Mg/Al ratio | F/Al ratio | Average particle diameter (nm) |
|---|---|---|---|
| Hydrotalcite particles 11 | 3.0 | 0.12 | 60 |
| Hydrotalcite particles 12 | 2.1 | 0.11 | 1000 |
| Hydrotalcite particles 13 | 2.1 | 0.74 | 400 |
| Hydrotalcite particles 14 | 2.1 | 0.00 | 400 |

The average particle diameter is the number average particle diameter Dh of the primary particles.

Production Example of Polyester Resin A

In a reactor equipped with a stirrer, a thermometer, and a cooler for outflow, 20 parts of propylene oxide-modified bisphenol A (2 mol adduct), 80 parts of propylene oxide-modified bisphenol A (3 mol adduct), 20 parts of terephthalic acid, 20 parts of isophthalic acid and 0.50 part of tetrabutoxytitanium were added and an esterification reaction was performed at 190° C.

Thereafter, 1 part of trimellitic anhydride (TMA) was added, the temperature was raised to 220° C., the pressure inside the system was gradually reduced, and a polycondensation reaction was performed at 150 Pa to obtain a polyester resin A. The acid value of the polyester resin A was 12 mg KOH/g, and the softening point was 110° C.

Preparation of Polyester Resin Particle-Dispersed Solution A

| | |
|---|---|
| Polyester resin A | 200 parts |
| Ion exchanged water | 500 parts |

The above materials were put in a stainless steel container, heated to 95° C. in a hot bath and melted, and 0.1 mol/L sodium bicarbonate was added, while thoroughly stirring at 7800 rpm using a homogenizer (manufactured by IKA: Ultra Turrax T50), to increase pH above 7.0. Thereafter, a mixed solution of 3 parts of sodium dodecylbenzenesulfonate and 297 parts of ion exchanged water was gradually added dropwise, and emulsification and dispersion were performed to obtain polyester resin particle-dispersed solution A.

When the particle size distribution of this polyester resin particle-dispersed solution A was measured using a particle size measuring device (LA-960V2, manufactured by Horiba, Ltd.), the number average particle diameter of the contained polyester resin A particles was 0.25 μm. In addition, coarse particles exceeding 1 μm were not observed.

Preparation of Wax Particle-dispersed Solution

| | |
|---|---|
| Ion exchanged water | 500 parts |
| Wax (hydrocarbon wax; endothermic peak maximum temperature 77° C.) | 250 parts |

The above materials were put in a stainless steel container, heated to 95° C. in a hot bath and melted, and 0.1 mol/L sodium bicarbonate was added, while thoroughly stirring at 7800 rpm using a homogenizer (manufactured by IKA: Ultra Turrax T50), to increase pH above 7.0.

Thereafter, a mixed solution of 5 parts of sodium dodecylbenzenesulfonate and 245 parts of ion exchanged water was gradually added dropwise, and emulsification and dispersion were performed. When the particle size distribution of wax particles contained in the wax particle-dispersed solution was measured using a particle size measuring device (LA-960V2, manufactured by Horiba, Ltd.), the number average particle diameter of the contained wax particles was 0.35 μm. In addition, coarse particles exceeding 1 μm were not observed.

Preparation of Colorant Particle-Dispersed Solution 1

| | |
|---|---|
| C. I. Pigment Blue 15:3 | 100 parts |
| Sodium dodecylbenzenesulfonate | 5 parts |
| Ion exchanged water | 400 parts |

The above materials were mixed and dispersed using a sand grinder mill. When the particle size distribution of colorant particles contained in the colorant particle-dispersed solution 1 was measured using a particle size measuring device (LA-960V2, manufactured by Horiba, Ltd.), the number average particle diameter of the contained colorant particles was 0.2 μm. In addition, coarse particles exceeding 1 were not observed.

Production Example of Toner Particles 1

| | |
|---|---|
| Polyester resin particle-dispersed solution A | 500 parts |
| Colorant particle-dispersed solution 1 | 50 parts |
| Wax particle-dispersed solution | 50 parts |
| Sodium dodecylbenzenesulfonate | 5 parts |

The polyester resin particle-dispersed solution A, the wax particle-dispersed solution, and sodium dodecylbenzenesulfonate were charged into a reactor (flask with a capacity of 1 L, baffle-attached anchor blades) and mixed uniformly. Meanwhile, the colorant particle-dispersed solution 1 was uniformly mixed in a 500 mL beaker, and this mixture was gradually added to the reactor while stirring to obtain a mixed dispersion liquid. A total of 0.5 parts of an aqueous aluminum sulfate solution as a solid content was dropped, while stirring the obtained mixed dispersion liquid, to form aggregated particles.

After completion of the dropping, the system was purged with nitrogen, and held at 50° C. for 1 h and further at 55° C. for 1 h. The temperature was then raised and held at 90° C. for 30 min. Thereafter, the temperature was lowered to 63° C. and held for 3 h to form fused particles. The reaction at this time was performed in a nitrogen atmosphere. After a predetermined time, cooling was performed at a rate of 0.5° C. per minute until the temperature reached room temperature.

After cooling, the reaction product was subjected to solid-liquid separation under a pressure of 0.4 MPa with a pressure filter having a capacity of 10 L to obtain a toner cake. Thereafter, ion exchanged water was added to fill the pressure filter with water, and washing was performed at a pressure of 0.4 MPa. Further, the same washing was carried out for a total of 3 times. Thereafter, solid-liquid separation was performed under a pressure of 0.4 MPa, followed by fluid bed drying at 45° C. to obtain a toner particle 1 having a volume-based median diameter of 6.8 μm.

Production Example of Toner Particle 2

Preparation of Aqueous Medium

Ion-exchanged water: 1,000.0 parts

Sodium phosphate: 14.0 parts

10% hydrochloric acid: 4.5 parts

The above materials were stirred at 12,000 rpm using a T. K. homomixer (manufactured by Tokushu Kika Kogyo Co., Ltd.) to obtain a mixture. The obtained mixture was kept warm at 65° C. for 60 minutes while being purged with nitrogen. Next, a calcium chloride aqueous solution obtained by dissolving 8 parts of calcium chloride in 10 parts of the ion-exchanged water was put all at once into the mixture to prepare an aqueous medium containing a dispersant. The pH of the prepared aqueous medium was 5.5.

Preparation of Pigment Dispersion Liquid 1: Pigment Dispersion Step

Styrene: 60.0 parts

Pigment Blue 15:3: 6.0 parts

Electrification control agent (manufactured by Orient Chemical Industry Co., Ltd.: Bontron E-88): 0.5 parts The above material and zirconia particles with a diameter of 1.7 mm were put in an attritor (Mitsui Miike Kakoki Co., Ltd.) and mixed at 220 rpm for 5 hours to disperse the coloring agent and the electrification control agent in the styrene. After the dispersion, the zirconia particles were separated to prepare a pigment dispersion liquid 1.

Preparation of Polymerizable Monomer Composition 1

Styrene: 15.0 parts n-butyl acrylate (n-BA): 25.0 parts

Polyester resin A: 6.0 parts

The above materials were mixed and stirred for 2 hours to dissolve the polyester resin A and obtain a polymerizable monomer composition 1.

Preparation of Polymerizable Monomer Composition 2

After the pigment dispersion liquid 1 and the polymerizable monomer composition 1 were mixed with each other, the following materials were added to the mixture.

Hydrocarbon wax (melting point: 77° C.): 10.0 parts

Divinylbenzene: 0.02 parts

After the addition, the mixture were warmed to 65° C. while being mixed. The above materials were uniformly dissolved at 500 rpm using a T. K. homomixer (manufactured by Tokushu Kika Kogyo Co., Ltd.) while the mixture was kept warm at 65° C. for 30 minutes to obtain a polymerizable monomer composition 2.

Granulation/Polymerization Step

The obtained polymerizable monomer composition 2 was put into the aqueous medium. Then, 10.0 parts of a polymerization initiator t-butyl peroxypivalate (25% toluene solution) was added thereto, and the mixture was stirred at 10,000 rpm for 5 minutes using a T. K. homomixer (manufactured by Tokushu Kika Kogyo Co., Ltd.) at 65° C. under a nitrogen purge to be granulated at pH 5.5. After that, the temperature was raised to 70° C. while the mixture was stirred with a paddle stirring blade, and the reaction was carried out for 5 hours while the mixture was stirred.

Distillation Step

After completion of the polymerization reaction, the temperature inside the vessel was raised to 100° C., and distillation was carried out for 4 hours.

Washing/Drying/Classification/External Addition Step

After the completion of the distillation step, the reaction container was cooled to 30° C. at 5° C./min, and 10% hydrochloric acid was added to the mixture to adjust the pH thereof to 2, and a dispersant was dissolved while the mixture was stirred for 2 hours. An emulsion thereby obtained was filtered under pressure and washed with 2,000 parts by mass or more of ion-exchanged water. The obtained cake was washed again with 1,000 parts by mass of ion-exchanged water while the mixture was stirred for 2 hours in a state where 10% hydrochloric acid was added thereto to adjust the pH to 1 or less.

An emulsion obtained in the same manner as above was filtered under pressure and washed with 2,000 parts by mass or more of ion-exchanged water, sufficiently aerated, dried, and air-classified to obtain a toner particle 2 having a volume-based median diameter of 7.0 μm.

Production Example of Toner Particle 3

Polyester resin A: 100 parts

Electrification control agent (manufactured by Orient Chemical Industry Co., Ltd.: Bontron E-88): 0.5 parts Hydrocarbon wax (melting point: 77° C.): 10.0 parts Pigment Blue 15:3: 6.0 parts The above raw materials were pre-mixed using a Henschel mixer FM10C (Mitsui Miike Kakoki Co., Ltd.) and then kneaded using a twin-screw kneading extruder (PCM-30: manufactured by Ikegai Ironworks Co., Ltd.) set at a rotation speed of 200 rpm with a set temperature adjusted such that a direct temperature near an exit of a kneaded product was 155° C. The obtained melt-kneaded product was cooled, and the cooled melt-kneaded product was coarsely pulverized with a cutter mill. After that, the obtained coarsely pulverized product was finely pulverized using a turbo mill T-250 (manufactured by Turbo Kogyo Co., Ltd.) with a feed amount of 20 kg/hr and an air temperature adjusted such that an exhaust temperature was 38° C. The obtained finely pulverized product was classified using a multi-division classifier utilizing Coanda effect to obtain a toner particle 3 having a volume-based median diameter of 7.3 μm.

Production Example of Toner 1

The hydrotalcite particles 1 (0.200 parts) and the silica particles 1 (1.50 parts) were externally mixed with the toner particle 1 (100.0 parts) obtained above using FM10C (manufactured by Nippon Coke Kogyo Co., Ltd.). As the external addition conditions, A0 blade was used as the lower blade, the distance from the deflector wall was set to 20 mm, and the external addition was performed in the state of the amount of toner particle charged: 2.0 kg, the rotation speed: 66.6 $s^{-1}$, the external addition time: 10 minutes, and cooling water at a temperature of 20° C. and a flow rate of 10 L/min.

Thereafter, a toner 1 was obtained by sieving with a mesh having an opening of 200 μm. Table 3 shows the physical properties of the obtained toner 1.

Production Examples of Toners 2 to 42

Toners 2 to 42 were obtained in the same manner as in the production example of the toner 1 except that the toner particle, the hydrotalcite particles, and silica particles were changed as shown in Table 3. Table 3 shows the physical properties of the obtained toners 2 to 42.

TABLE 3

| | Toner particles | | Hydrotalcite particles | | | Silica particles | | | |
|---|---|---|---|---|---|---|---|---|---|
| | No. | Added amount (parts) | No. | Dh (nm) | Wh (parts) | No. | Ds (nm) | Ws (parts) | Ws/Wh |
| Toner 1 | 1 | 100 | 1 | 400 | 0.200 | 1 | 7 | 1.50 | 7.5 |
| Toner 2 | 1 | 100 | 1 | 400 | 0.050 | 1 | 7 | 0.80 | 16.0 |
| Toner 3 | 1 | 100 | 1 | 400 | 1.000 | 1 | 7 | 2.00 | 2.0 |
| Toner 4 | 1 | 100 | 1 | 400 | 0.500 | 1 | 7 | 5.00 | 10.0 |
| Toner 5 | 1 | 100 | 1 | 400 | 0.100 | 1 | 7 | 0.10 | 1.0 |
| Toner 6 | 1 | 100 | 1 | 400 | 0.200 | 2 | 40 | 1.50 | 7.5 |
| Toner 7 | 1 | 100 | 1 | 400 | 0.200 | 3 | 10 | 1.50 | 7.5 |
| Toner 8 | 1 | 100 | 1 | 400 | 0.200 | 4 | 12 | 1.50 | 7.5 |
| Toner 9 | 1 | 100 | 1 | 400 | 0.200 | 5 | 15 | 1.50 | 7.5 |
| Toner 10 | 1 | 100 | 1 | 400 | 0.050 | 1 | 7 | 1.00 | 20.0 |
| Toner 11 | 1 | 100 | 1 | 400 | 1.000 | 1 | 7 | 1.00 | 1.0 |
| Toner 12 | 1 | 100 | 1 | 400 | 1.000 | 1 | 7 | 5.00 | 5.0 |
| Toner 13 | 1 | 100 | 1 | 400 | 0.500 | 1 | 7 | 0.20 | 0.4 |
| Toner 14 | 1 | 100 | 1 | 400 | 0.200 | 6 | 12 | 1.50 | 7.5 |
| Toner 15 | 1 | 100 | 1 | 400 | 0.200 | 7 | 18 | 1.50 | 7.5 |
| Toner 16 | 1 | 100 | 1 | 400 | 0.075 | 1 | 7 | 1.50 | 20.0 |
| Toner 17 | 1 | 100 | 2 | 400 | 0.200 | 1 | 7 | 1.50 | 7.5 |
| Toner 18 | 1 | 100 | 3 | 400 | 0.200 | 1 | 7 | 1.50 | 7.5 |
| Toner 19 | 1 | 100 | 4 | 400 | 0.200 | 1 | 7 | 1.50 | 7.5 |
| Toner 20 | 1 | 100 | 5 | 400 | 0.200 | 1 | 7 | 1.50 | 7.5 |
| Toner 21 | 1 | 100 | 6 | 400 | 0.200 | 1 | 7 | 1.50 | 7.5 |
| Toner 22 | 1 | 100 | 7 | 400 | 0.200 | 1 | 7 | 1.50 | 7.5 |
| Toner 23 | 1 | 100 | 8 | 400 | 0.200 | 1 | 7 | 1.50 | 7.5 |
| Toner 24 | 1 | 100 | 9 | 800 | 0.200 | 1 | 7 | 1.50 | 7.5 |
| Toner 25 | 1 | 100 | 10 | 100 | 0.200 | 1 | 7 | 1.50 | 7.5 |
| Toner 26 | 1 | 100 | 11 | 60 | 0.200 | 1 | 7 | 1.50 | 7.5 |
| Toner 27 | 1 | 100 | 12 | 1000 | 0.200 | 8 | 7 | 1.50 | 7.5 |
| Toner 28 | 1 | 100 | 13 | 400 | 0.200 | 1 | 7 | 1.50 | 7.5 |
| Toner 29 | 1 | 100 | 1 | 400 | 0.200 | 9 | 12 | 1.50 | 7.5 |
| Toner 30 | 1 | 100 | 1 | 400 | 0.200 | 10 | 8 | 1.50 | 7.5 |
| Toner 31 | 1 | 100 | 1 | 400 | 0.200 | 11 | 100 | 1.50 | 7.5 |
| Toner 32 | 2 | 100 | 1 | 400 | 0.200 | 1 | 7 | 1.50 | 7.5 |
| Toner 33 | 3 | 100 | 1 | 400 | 0.200 | 1 | 7 | 1.50 | 7.5 |
| Toner 34 | 1 | 100 | 14 | 400 | 0.200 | 1 | 7 | 1.50 | 7.5 |
| Toner 35 | 1 | 100 | 1 | 400 | 0.200 | 12 | 7 | 1.50 | 7.5 |
| Toner 36 | 1 | 100 | 1 | 400 | 0.200 | 13 | 30 | 1.50 | 7.5 |
| Toner 37 | 1 | 100 | — | — | — | 1 | 7 | 1.50 | — |
| Toner 38 | 1 | 100 | 1 | 400 | 0.010 | 1 | 7 | 1.50 | 150.0 |
| Toner 39 | 1 | 100 | 1 | 400 | 2.000 | 1 | 7 | 2.00 | 1.0 |
| Toner 40 | 1 | 100 | 1 | 400 | 1.000 | 1 | 7 | 6.50 | 6.5 |
| Toner 41 | 1 | 100 | 1 | 400 | 0.500 | 1 | 7 | 0.10 | 0.2 |
| Toner 42 | 1 | 100 | 1 | 400 | 0.200 | 14 | 8 | 1.50 | 7.5 |

"Mg/Al", "F/Al", "D/Q", "D/(S−Q)", "M/S", and "the circularity of the silica particles" measured by the method described above using each of the toners 1 to 42 were the same as the result or the numerical value obtained by analyzing the hydrotalcite particles or silica particles used alone. Further, it is verified that, in the toners 1 to 33, 35, 36, and 38 to 42, the fluorine is present inside the hydrotalcite particles in the line analysis of the STEM-EDS mapping analysis.

Image Evaluation

A method for evaluating each of the toners 1 to 42 will be described below. The evaluation results are shown in Tables 4 and 5.

The evaluation method and the evaluation criteria are as follows.

For used as an image forming apparatus, a commercially available laser printer "LBP-9660Ci (manufactured by Canon Inc.)" was modified to have a process speed of 325 mm/sec. Further, a commercially available toner cartridge (cyan) (manufactured by Canon Inc.), which is a process cartridge, was used.

After removing a product toner from the inside of the cartridge and cleaning it by an air blow, 270 g of each toner to be evaluated was filled. Yellow, magenta, and black stations were evaluated by removing product toners and inserting yellow, magenta, and black cartridges in which a remaining toner amount detection mechanism was disabled.

(1) Evaluation of Electrification Rising Property

The process cartridge, the modified laser printer, and the evaluation paper (CS-068 (manufactured by Canon Inc.) A4: 68 g/m$^2$) were placed in a high temperature and high humidity environment (30° C./80% RH, hereinafter, an H/H environment) for 48 hours.

In the H/H environment, an image in which, when the paper is viewed vertically, a 10 mm long horizontal band-shaped all-cyan image portion (the amount of spread: 0.45 mg/cm$^2$) is present over a 10 mm position to a 20 mm position from a leading edge of the paper, a 10 mm long all-white image portion (the amount of spread: 0.00 mg/cm$^2$) is present downstream from the all-cyan image portion, and a 100 mm long halftone image portion (the amount of spread: 0.20 mg/cm$^2$) is present further downstream from the all-white image portion, was output on the evaluation paper.

The electrification rising property was evaluated according to the following criteria on the basis of a difference between the image density of a portion on the halftone image portion which is present downstream from the all-cyan image portion by one revolution of a development roller and the image density of a portion on the halftone image portion which is present downstream from the all-white image portion by one revolution of the development roller on the halftone image portion (an image density difference).

The image density is measured by measuring a relative density against the white background portion of the used paper using a "Macbeth reflection densitometer RD918" (manufactured by Macbeth Co., Ltd.) according to the attached instruction manual, and the obtained relative density was taken as a value of the image density.

The electrification rising property was evaluated according to the following evaluation criteria. C or more was determined to be good. If the electrification rising property is good, the toner supplied onto an electrification roller is quickly electrified, and thus the image density does not change after the all-cyan image portion and after the all-white image portion, and a good image can be obtained.

Evaluation Criteria of Electrification Rising Property

A: Image density difference is less than 0.03

B: Image density difference is 0.03 or more and less than 0.06

C: Image density difference is 0.06 or more and less than 0.10

D: Image density difference is 0.10 or more (2) Evaluation of Durability

After the evaluation of the electrification rising property, an image with a printing ratio of 1.0% was continuously output on the evaluation paper by 25,000 sheets in the H/H environment. After they were placed in the same environment for 72 hours, the same evaluation as the evaluation of the electrification rising property was performed.

Evaluation was performed according to the evaluation criteria of the electrification rising property, and this evaluation was taken as evaluation of the durability.

(3) Evaluation of Developing Blade Fusion

In the evaluation of the durability, a cartridge which had performed printing by 25,000 sheets in the H/H environment was taken out from a printer main body, and a fused matter on a developing blade was visually and microscopically observed. As the microscope, an ultra-deep shape measuring microscope (manufactured by Keyence Corporation) was used.

Evaluation was performed based on the following criteria from the evaluation image and the result of visual/microscopic observations. It is known that in the present endurance test, the hydrotalcite particles detached from the toner form aggregates or the like together with the spherical silica particles, and the aggregates grow along with the endurance use, thereby lowering the evaluation result. C or higher was determined as good.

A: there is no problem on the image, and no fused material is observed by microscopic observation.

B: there is no problem in the image, and a very small amount of fused material is observed by microscopic observation.

C: three or more vertical streaks with low density are seen in the halftone image.

D: three or more white vertical streaks are seen in the solid image.

(4) Evaluation of Regulation Failure

The regulation failure was evaluated in a low temperature and low humidity environment (15° C./10% RH, hereinafter referred to as an L/L environment) that is severe against charge-up. Intermittent durability evaluation in which an image with a printing rate 1% was output on the evaluation paper (CS-068 (manufactured by Canon Inc.) A4: 68 g/m$^2$) by 2 sheets every 4 seconds with the process cartridge of the modified laser printer in the L/L environment was performed for 30,000 sheets. A halftone image having a toner loading amount of 0.3 mg/cm$^2$ was printed after the sheet were passed, and the amount of spot-like streaks and toner lumps appearing on the halftone image was evaluated.

Evaluation Criteria of Regulation Failure

A: Not generated

B: There are no spot-like streaks, but there are two or three small toner lumps

C: There are some spot-like streaks at edges, or there are 4 or 5 small toner lumps D: There are spot-like streaks on the entire surface, or there are 6 or more small toner lumps or obvious toner lumps.

(5) Evaluation of Solid Followability

The solid followability in L/L environment was evaluated by the following method. In the L/L environment, 5,000 sheets continuously passed for a day with a printing rate 1% for the evaluation paper (CS-068 (manufactured by Canon Inc.) A4: 68 g/m$^2$), the process cartridge, and the modified laser printer, and then they are left in an instrument for a day, and after that, the solid followability was evaluated.

The all-cyan image was continuously output by 3 sheets as a sample image, and the solid followability was visually evaluated for the obtained 3 sheets of the all-cyan image. The evaluation criteria are as follows. It is known that the higher the fluidity of the toner, the better the results obtained for the above evaluation items. After 15,000 sheets were passed, the evaluation was performed.

Evaluation Criteria of Solid Followability

A: It is uniform without unevenness in the image density

B: There is slight unevenness in the image density

C: There is unevenness in the image density, but it is no problem level

D: There is unevenness in the image density, and it is a level that is not a uniform solid image

Examples 1 to 33

In Examples 1 to 33, the toners 1 to 33 were used as the toner, and the above evaluation was performed. Table 4 shows the evaluation results.

Comparative Examples 1 to 9

In Comparative Examples 1 to 9, the toners 34 to 42 were used as the toner, and the above evaluation was performed. Table 5 shows the evaluation results.

TABLE 4

| Example | Toner | H/H electrification rising property in initial stage | after long-term durable use | Developing blade fusion | L/L regulation failure | L/L solid followability |
|---|---|---|---|---|---|---|
| Example 1 | Toner 1 | A | A | A | A | A |
| Example 2 | Toner 2 | B | B | A | A | A |
| Example 3 | Toner 3 | A | A | A | B | B |
| Example 4 | Toner 4 | A | B | A | A | A |
| Example 5 | Toner 5 | A | B | A | B | B |
| Example 6 | Toner 6 | B | B | A | A | B |
| Example 7 | Toner 7 | A | A | A | B | B |
| Example 8 | Toner 8 | A | B | A | B | A |
| Example 9 | Toner 9 | A | A | A | B | A |
| Example 10 | Toner 10 | B | B | B | A | A |
| Example 11 | Toner 11 | A | A | A | A | B |
| Example 12 | Toner 12 | B | B | B | B | B |
| Example 13 | Toner 13 | B | B | A | B | B |
| Example 14 | Toner 14 | A | A | A | A | A |
| Example 15 | Toner 15 | A | A | A | A | B |
| Example 16 | Toner 16 | A | B | B | A | A |
| Example 17 | Toner 17 | A | A | A | B | A |
| Example 18 | Toner 18 | A | A | A | A | A |
| Example 19 | Toner 19 | A | A | A | B | A |
| Example 20 | Toner 20 | A | B | A | B | A |
| Example 21 | Toner 21 | A | B | A | A | A |
| Example 22 | Toner 22 | A | A | A | A | A |
| Example 23 | Toner 23 | A | A | A | A | B |
| Example 24 | Toner 24 | A | A | A | A | B |
| Example 25 | Toner 25 | A | A | A | A | A |
| Example 26 | Toner 26 | A | B | B | A | A |
| Example 27 | Toner 27 | A | B | B | A | B |
| Example 28 | Toner 28 | B | B | B | B | A |
| Example 29 | Toner 29 | A | B | A | B | A |
| Example 30 | Toner 30 | B | B | A | B | A |
| Example 31 | Toner 31 | B | B | C | B | B |
| Example 32 | Toner 32 | A | A | A | A | A |
| Example 33 | Toner 33 | A | B | B | A | B |

TABLE 5

| Comparative Example | Toner | H/H electrification rising property in initial stage | after long-term durable use | Developing blade fusion | L/L failure regulation | L/L solid followability |
|---|---|---|---|---|---|---|
| Comparative Example 1 | Toner 34 | A | B | A | D | D |
| Comparative Example 2 | Toner 35 | B | D | D | D | C |
| Comparative Example 3 | Toner 36 | B | D | D | D | C |
| Comparative Example 4 | Toner 37 | D | D | A | B | A |
| Comparative Example 5 | Toner 38 | C | D | D | B | A |
| Comparative Example 6 | Toner 39 | B | B | D | D | D |
| Comparative Example 7 | Toner 40 | B | D | B | C | A |
| Comparative Example 8 | Toner 41 | B | D | C | D | D |
| Comparative Example 9 | Toner 42 | B | B | B | B | D |

In Examples 1 to 33, good results were obtained in all evaluation items. On the other hand, in Comparative Examples 1 to 9, the results were inferior to those of Examples in any of the above evaluation items.

From the above results, according to the present disclosure, it is possible to provide a toner that achieves all of the high electrification property, developability, and fluidity at high levels through long-term durable use regardless of the usage environment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-028815, filed Feb. 28, 2022, and Japanese Patent Application No. 2022-187676, filed Nov. 24, 2022, which are hereby incorporated by reference herein in their entirety.

What is claimed is:

1. A toner, comprising:

a toner particle; and an external additive, the external additive comprising a silica particle and a hydrotalcite particle that contains aluminum;

a number average particle diameter Ds of a primary particle of the silica particle being 7 to 40 nm, a number average particle diameter Dh of a primary particle of the hydrotalcite particle being 200 to 1,000 nm, and Dh/Ds being 400/18 to 1000/7;

fluorine being present inside the hydrotalcite particle in line analysis of STEM-EDS mapping analysis of the toner, and a value of a ratio F/Al in an atomic concentration of fluorine to aluminum in the hydrotalcite particle is 0.02 to 0.60 obtained from main component mapping of the hydrotalcite particle by STEM-EDS mapping analysis of the toner; and Wh is 0.040 to 1.000 parts by mass when Wh is a content of the hydrotalcite particle with respect to 100 parts by mass of the toner particle, Ws is 0.08 to 6.00 parts by mass when Ws is a content of the silica particle with respect to 100 parts by mass of the toner particle, and $0.4 \leq Ws/Wh \leq 20.0$, wherein $$0.05 \leq D/Q \leq 0.50 \text{ and}$$

$$0.95 \leq D/(S-Q) \leq 1.00$$

when S is a sum of areas of peaks of an M unit, a D unit, a T unit and a Q unit which are present in a range of −140 to 100 ppm of a chemical shift of the silica particle obtained by a solid-state $^{29}$Si-NMR DD/MAS method, D is an area of a peak of the D unit of which a peak top is present in a range of −25 to −15 ppm, and Q is an area of a peak of the Q unit of which a peak top is present in a range of −130 to −85 ppm.

2. The toner according to claim 1, wherein the hydrotalcite particle contains magnesium and aluminum.

3. The toner according to claim 2, wherein a value of a ratio Mg/Al in an atomic concentration of the magnesium to the aluminum in the hydrotalcite particle is 1.5 to 4.0, which is obtained from main component mapping of the hydrotalcite particle by STEM-EDS mapping analysis of the toner.

4. The toner according to claim 1, wherein M/S is 0.010 or less when M is an area of a peak of the M unit of which a peak top is present in a range of 10 to 25 ppm of the chemical shift of the silica particle obtained by the solid-state $^{29}$Si-NMR DD/MAS method.

5. The toner according to claim 1, wherein the silica particle has a circularity of less than 0.80.

6. The toner according to claim 1, wherein the silica particle is a silicone oil-treated silica particle.

* * * * *